US009727982B2

(12) United States Patent
Pan et al.

(10) Patent No.: US 9,727,982 B2
(45) Date of Patent: Aug. 8, 2017

(54) PARALLELISING PER-PIXEL COMPOSITING

(71) Applicant: CANON KABUSHIKI KAISHA, Tokyo (JP)

(72) Inventors: Zhi-Min Pan, Carlingford (AU); David Ian Johnston, Leichhardt (AU); Gregory Joseph Johnson, North Epping (AU); Kok Tjoan Lie, Como (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/145,106

(22) Filed: May 3, 2016

(65) Prior Publication Data

US 2016/0328633 A1 Nov. 10, 2016

(30) Foreign Application Priority Data

May 5, 2015 (AU) .................................. 2015202359

(51) Int. Cl.
*G06K 15/02* (2006.01)
*G06T 11/00* (2006.01)
(Continued)

(52) U.S. Cl.
CPC ............ *G06T 11/00* (2013.01); *G06F 3/1208* (2013.01); *G06F 3/1212* (2013.01); *G06F 3/1243* (2013.01); *G06F 3/1248* (2013.01); *G06K 15/181* (2013.01); *G06K 15/1817* (2013.01); *G06K 15/1822* (2013.01); *G06K 15/1851* (2013.01); *G06K 15/1852* (2013.01); *G06K 15/1859* (2013.01); *G06T 15/503* (2013.01);
(Continued)

(58) Field of Classification Search
CPC ............ G06K 15/181; G06K 15/1817; G06K 15/1822; G06K 15/1851; G06K 15/1852; G06K 15/1859; G06K 2215/0082; G06T 11/00; G06T 2200/28; G06F 3/1208; G06F 3/1212; G06F 3/1243; G06F 3/1248

See application file for complete search history.

(56) References Cited

U.S. PATENT DOCUMENTS 6,369,830 B1    4/2002   Brunner et al.
7,750,922 B2 *  7/2010   Parenteau ............. G06T 15/503
                                                                345/537

(Continued)

*Primary Examiner* — Scott A Rogers
(74) *Attorney, Agent, or Firm* — Canon USA, Inc. I.P. Division

(57) ABSTRACT

A method of compositing layers by grouping the layers into a foreground group and a background group; identifying independent instructions of compositing model for execution independently from the background group and dependent instructions requiring a compositing output of a background layer in order to composite foreground layers; executing the independent instructions on the foreground layers in parallel with compositing the background layers, a first independent instruction storing a corresponding result in a first buffer and a second independent instruction storing a corresponding result in a second buffer; executing a dependent instruction by updating the second buffer using the background compositing output; and determining a compositing output for the foreground group dependent upon contents of the first buffer and the updated second buffer.

13 Claims, 17 Drawing Sheets

(51) Int. Cl.
*G06F 3/12* (2006.01)
*G06T 15/50* (2011.01)
(52) U.S. Cl.
CPC .. *G06K 2215/0082* (2013.01); *G06T 2200/28* (2013.01)

(56) References Cited

U.S. PATENT DOCUMENTS

| | | | | |
|---|---|---|---|---|
| 7,864,197 | B2 * | 1/2011 | Brown | G06T 11/60 345/592 |
| 7,978,204 | B2 | 7/2011 | Ruge | |
| 8,446,426 | B2 * | 5/2013 | Gonion | G06T 15/503 345/592 |
| 8,810,847 | B2 * | 8/2014 | Ito | G06F 3/1208 358/1.1 |
| 8,907,979 | B2 * | 12/2014 | Lau | G06T 15/04 345/545 |
| 8,948,509 | B2 * | 2/2015 | Wright | G06T 11/00 382/167 |
| 9,390,689 | B2 * | 7/2016 | Belbin | G09G 5/377 |
| 2005/0195220 | A1 * | 9/2005 | Northway | G06T 11/00 345/620 |
| 2015/0286904 | A1 * | 10/2015 | Hitosugi | G06K 15/1851 358/1.15 |

\* cited by examiner

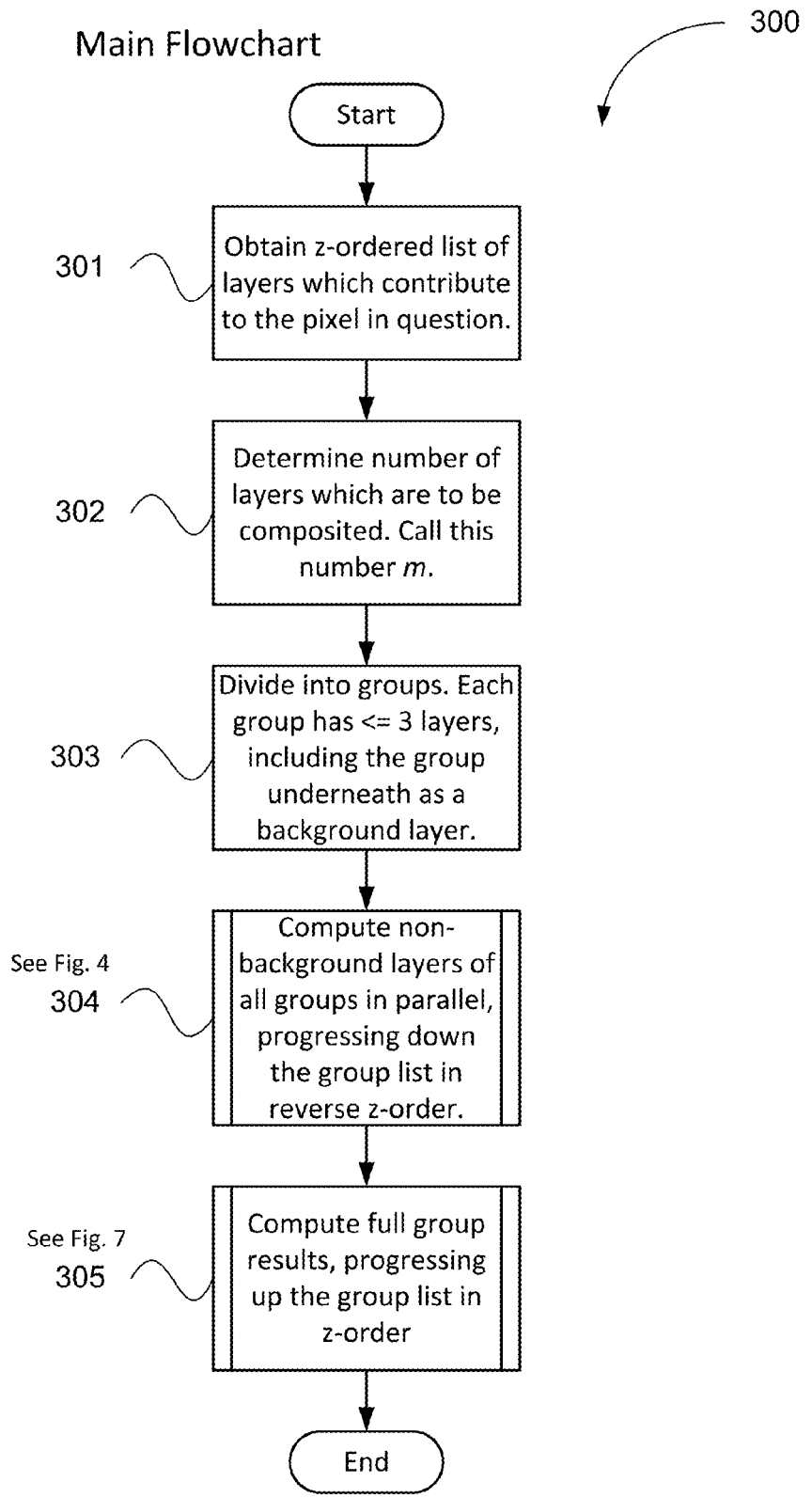

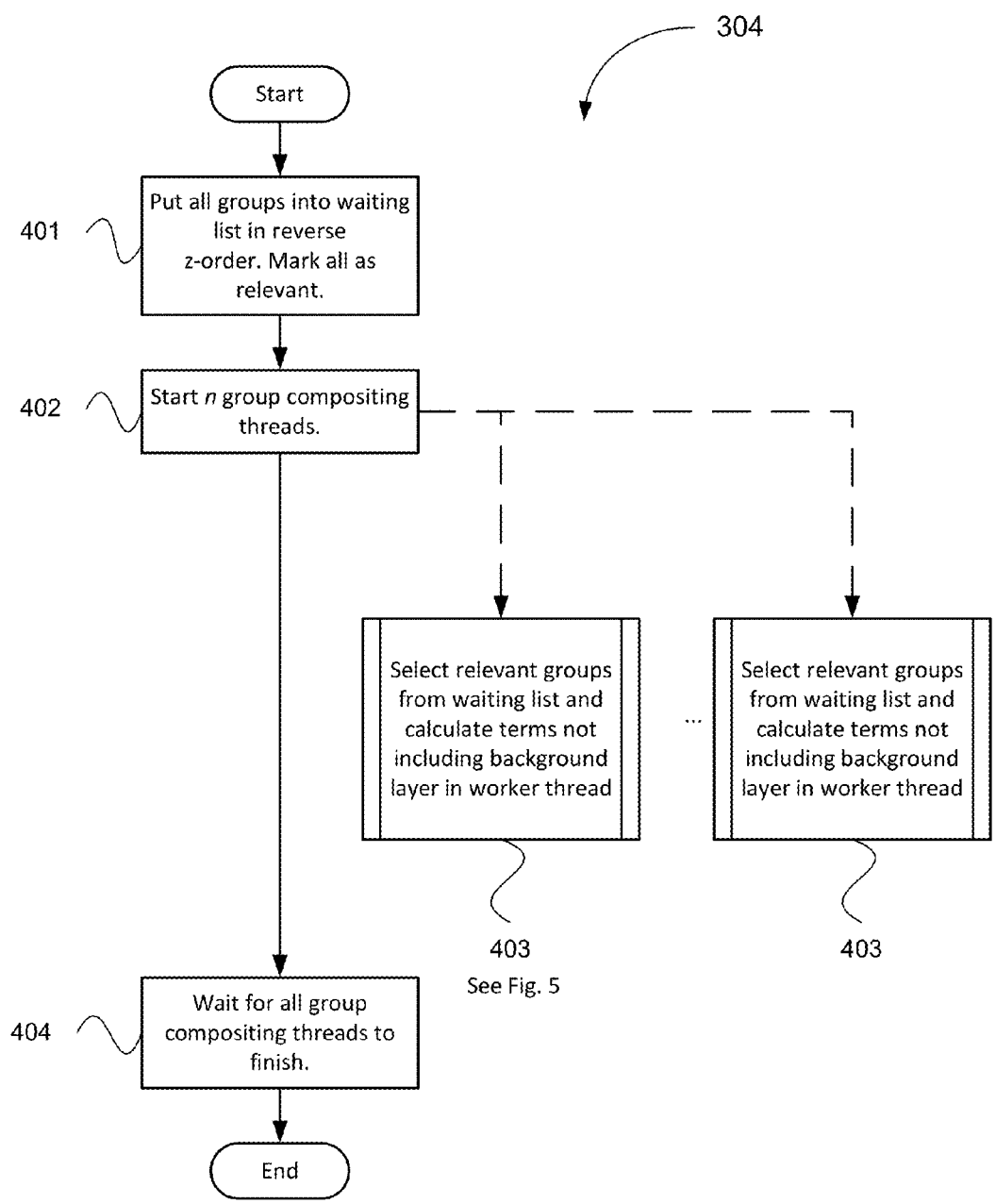

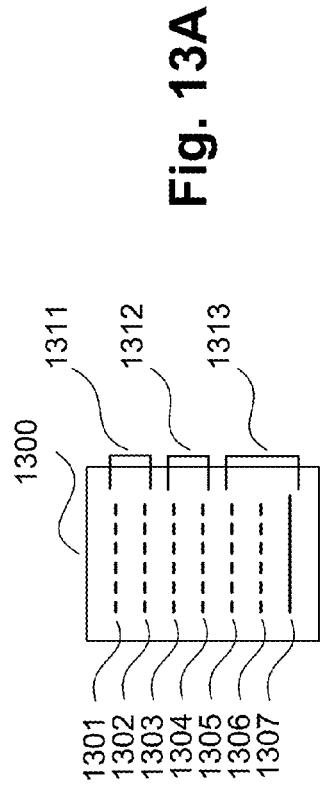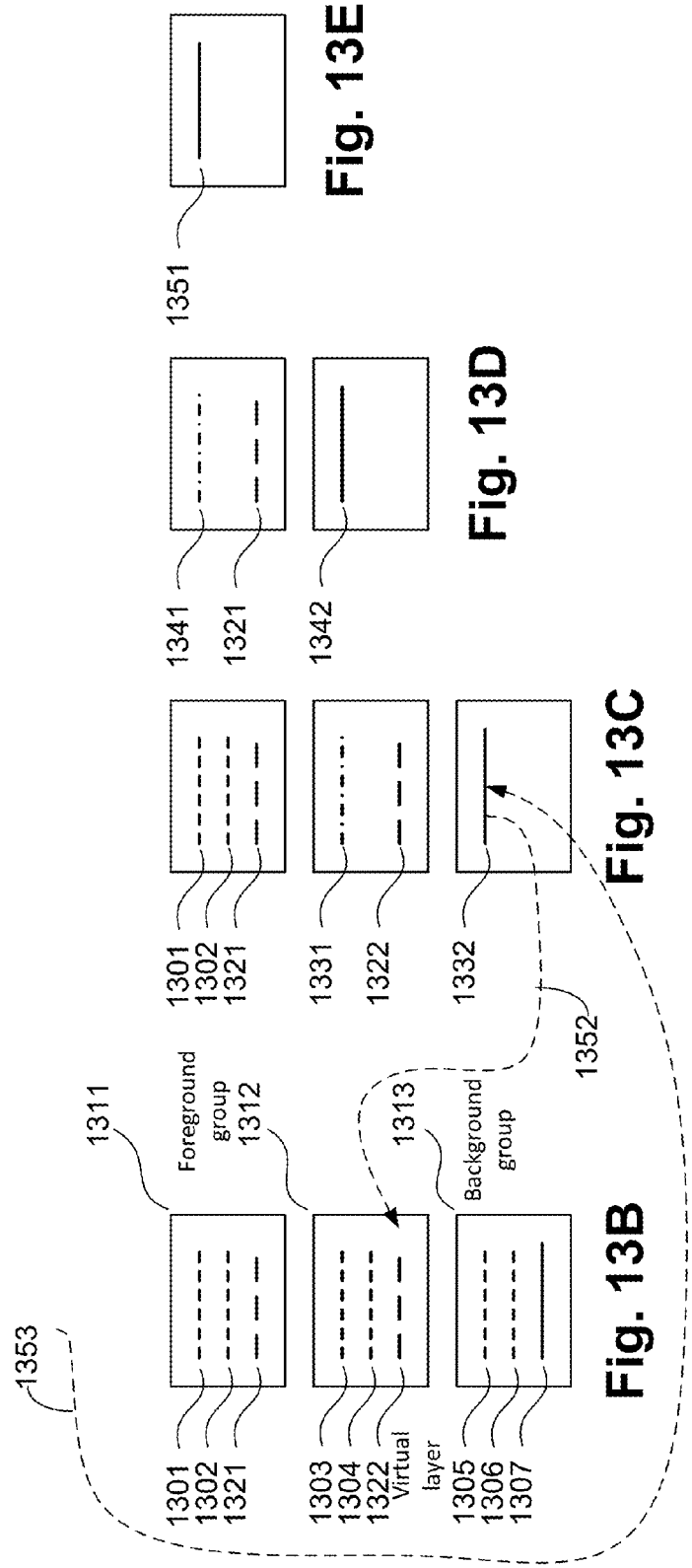

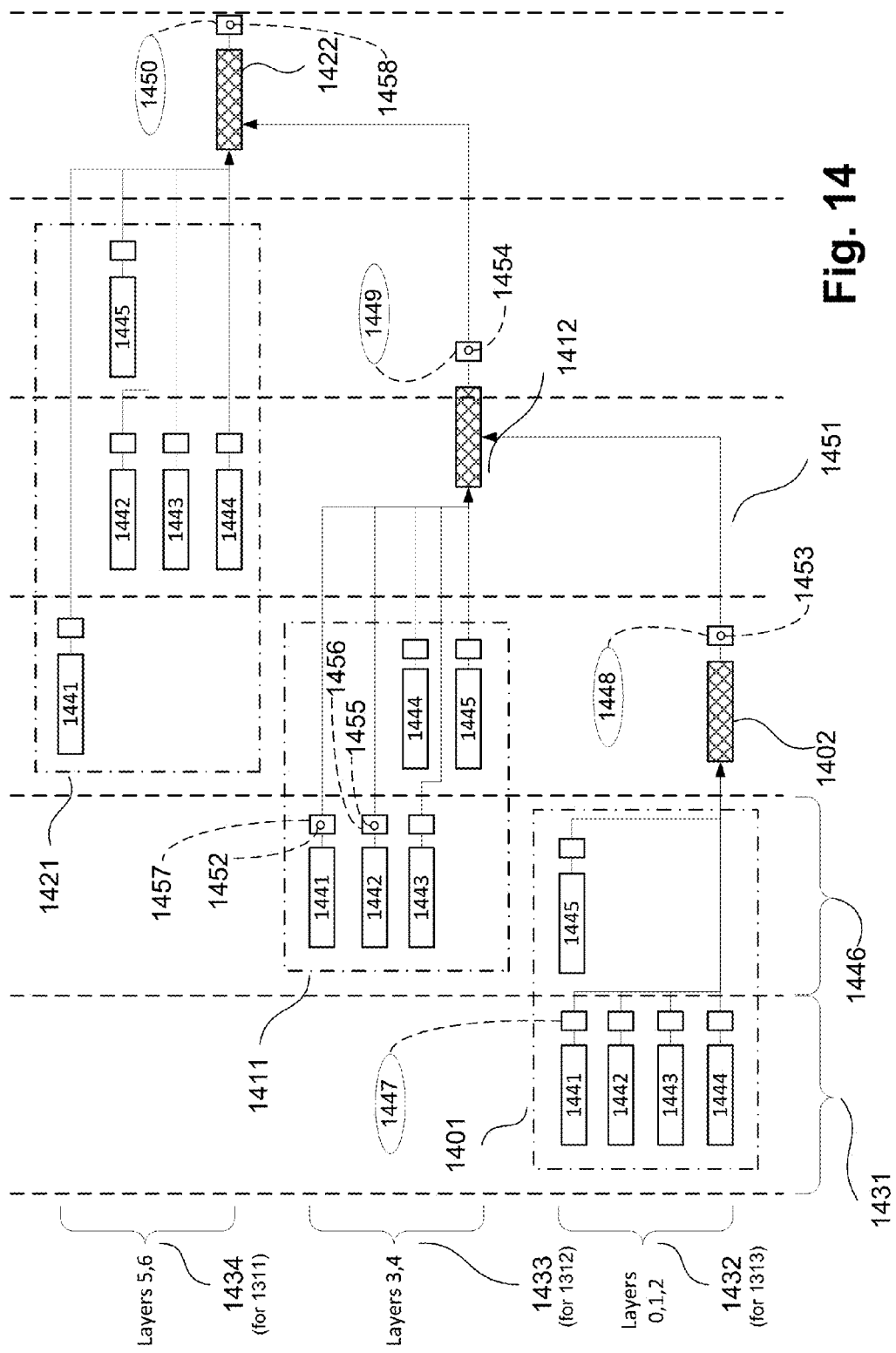

PARALLELISING PER-PIXEL COMPOSITING

REFERENCE TO RELATED PATENT APPLICATION(S)

This application claims the benefit under 35 U.S.C. §119 of the filing date of Australian Patent Application No. 2015202359, filed 5 May 2015, which is hereby incorporated by reference in its entirety as if fully set forth herein.

TECHNICAL FIELD

The present invention relates generally to compositing and blending multi-level translucent objects in a printing system. The present invention also relates to a method and apparatus for compositing and blending multi-level translucent objects in a printing system, and to a computer program product including a computer readable medium having recorded thereon a computer program for compositing and blending multi-level translucent objects in a printing system.

BACKGROUND

Print rendering systems need to composite and blend multiple graphic objects with different opacities to produce final print-ready page data. Printing systems need to composite and blend objects in a timely manner to meet the page rate of the output printing engine. As the resolution and speed of print engines increases, new methods for compositing and blending of graphics objects are required to keep up with the output print engine.

Traditional Porter and Duff compositing requires that all pixels of the same X,Y location on a page contributing to a result for that location be processed in order up the z-stack (the z-ordered list of image layers that contribute to the colour of a pixel), with the page background processed first, and the top-most layer processed last. This ordering is required, as that is the order in which objects are placed on the page by the input PDL file, and the order cannot be changed as Porter and Duff compositing is not commutative for every blend mode. The term "commutative" can be understood by reference to the arithmetic operation of addition which is commutative over a set of real numbers, meaning that a+b=b+a for all real numbers a and b. This constraint on traditional Porter and Duff compositing can lead to unnecessary processing, because if a layer other than the bottom layer is fully opaque, then there is no need to process the layers below. Since the layers are processed from the bottom up, however, a fully opaque layer is not detected until all layers beneath it have already been processed.

Traditional renderers, both edge based and "painters algorithm" based, have used different methods to mitigate the above. PDL groups of objects in the z-stack can sometimes be rendered separately for some blend modes. The printed page can be broken into bands or tiles, and these can be rendered in parallel. However, this approach is poorly suited to massively parallel systems (such as Graphic Processing Units or GPUs), as the segmentation of the work is coarse.

For an edge based renderer, one solution to the opaque efficiency issue with bottom-up compositing is to modify the bottom-up algorithm to be a two pass algorithm. An initial, fast, top-down scan of the z-stack of layers is used to locate the top-most fully opaque layer by examining the compositing data of each layer identified previously. The bottom-up compositing process is then done in a second pass, and starts from the top-most fully opaque layer. While this partially solves the above issue of detecting a fully opaque layer, the method only detects an opaque layer on a per-object basis. Therefore, if an object has a mixture of opaque and transparent pixels, e.g. an image mask, then the whole object is marked as transparent and compositing would be performed for all pixels of the object, which is a computationally intensive operation.

Some prior-art methods are able to overcome the serial nature of compositing and the opaque layer efficiency issue by restricting compositing operations to the associative Porter and Duff compositing operations and thereby allowing a final compositing output for each group in the z-stack to be determined independently from an output of any other group in the z-stack. The associative property of an operation states that you can perform the operation regardless of how the numbers are grouped. By 'grouped' we mean 'how you use parenthesis'. In other words, if you are adding or multiplying it does not matter where you put the parenthesis. For example, if a+(b+c)=(a+b)+c for any a, b and c in a set, then operation "+" is associative.

Given that the prior-art methods are restricted to associative compositing operations, i.e. are not applicable to non-associative compositing operations, they would provide an incorrect compositing output if there are non-associative compositing operations in a z-stack of layers. Modern printing systems, however, must cope with a variety of blend modes, including non-associative compositing operations. Therefore, there is a need for a system and method for parallelising compositing of a plurality layers in accordance with general, including non-associative, compositing operations.

SUMMARY

It is an object of the present invention to substantially overcome, or at least ameliorate, one or more disadvantages of existing arrangements.

This specification describes a method for parallelised per pixel compositing which utilise multiple CPU cores or GPU to perform concurrent compositing in parallel more efficiently without the disadvantages of the prior art described.

Disclosed are arrangements, referred to as Concurrent Independent Layer Processing (CILP) arrangements, which seek to address the above by compositing a plurality of layers according to methods disclosed herein.

According to one aspect of the present invention, there is provided a method of compositing a plurality of layers, the method comprising the steps of: grouping the plurality of layers comprising image data into at least a foreground group and a background group to be composited by separate computing threads, wherein a foreground compositing model for compositing layers in the foreground group is dependent on a compositing output for the background group; identifying, in relation to the foreground group, independent instructions of the foreground compositing model to be executed independently from the background group and dependent instructions of the foreground compositing model requiring a compositing output of at least one layer of the background group in order to composite layers in the foreground group; executing the identified independent instructions using image data associated with the layers in the foreground group in parallel with compositing the layers in the background group, a first independent instruction storing a corresponding result of execution in a first buffer and a second independent instruction storing a corresponding result in a second buffer; upon receipt of the compositing output for the background group, executing the dependent compositing instruction by updating the second buffer using the background compositing output; and determining a compositing output for the foreground group dependent upon contents of the first buffer and the updated second buffer.

According to another aspect of the present invention, there is provided an apparatus for implementing any one of the methods described herein.

According to another aspect of the present invention, there is provided a computer program product including a computer readable medium having recorded thereon a computer program for implementing any one of the methods described herein.

Other aspects of the invention are also disclosed.

BRIEF DESCRIPTION OF THE DRAWINGS

One or more embodiments of the invention will now be described with reference to the following drawings, in which:

FIG. 3 is a flow diagram depicting a method for parallelising per-pixel compositing, according to a first CILP arrangement;

FIG. 4 is a flow diagram illustrating the first pass processing;

FIGS. 13A-13E is a depiction illustrating the division of layers into groups and the compositing of those layer groups;

FIG. 14 is a depiction illustrating the scheduling of dependent and independent compositing instructions;

DETAILED DESCRIPTION INCLUDING BEST MODE

Figure 1A:
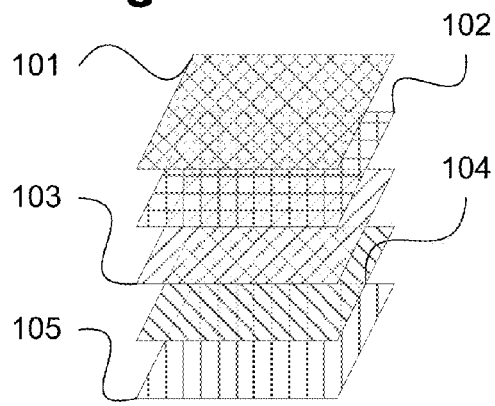
FIG. 1A depicts an example of a compositing stack.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices. Such discussions should not be interpreted as a representation by the inventors or the patent applicant that such documents or devices in any way form part of the common general knowledge in the art.

Overview of the CILP Arrangement

General Overview

The disclosed CILP arrangements are based on a multi-layer compositing method derived from standard Porter and Duff two-layer compositing operations. The Porter and Duff two-layer operations are well understood by anyone skilled in the art and an understanding of Porter and Duff compositing is expected in order to understand the disclosed CILP arrangements.

A brief description of traditional Porter and Duff compositing is now provided with reference to FIGS. 1A, 1B, 1C, 1D, 1E and 1F.

FIG. 1A shows five (5) z-ordered layers that contribute to the colour of a pixel. A bottom-most layer (likely the page background) is the layer labelled 105. The layers above that are, in ascending order, 104, 103, 102, and 101 which is the top-most layer. Each layer has an associated colour and opacity value. Furthermore, each layer, except for the background layer 105, has an associated compositing operator which defines how the layer composites with the layer below. These layers, along with their colour, opacity values and the compositing operators will have been specified in an input Page Description Language (PDL), which describes the graphical objects placed upon the page to be printed.

Figure 1B:
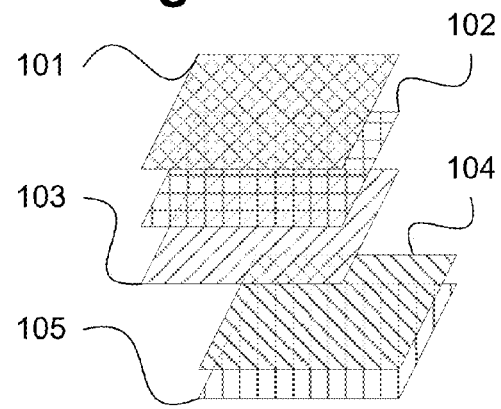
FIG. 1B depicts the first stage of the example compositing stack being rendered by a traditional renderer.
Figure 1C:
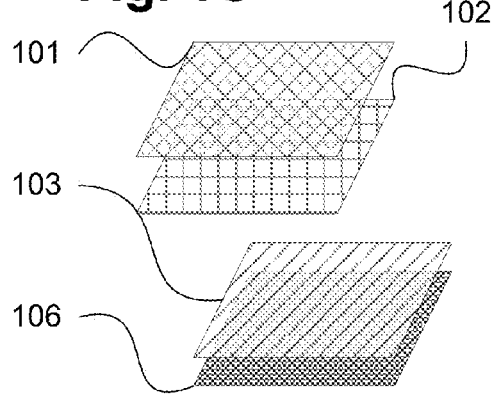
FIG. 1C depicts the second stage of the example compositing stack being rendered by a traditional renderer.
Figure 1D:
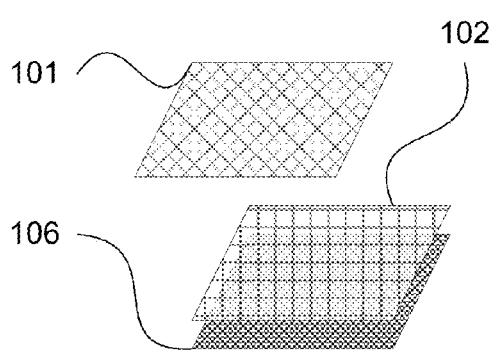
FIG. 1D depicts the third stage of the example compositing stack being rendered by a traditional renderer.
Figure 1E:
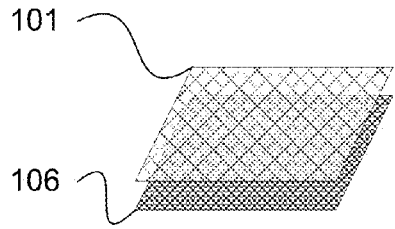
FIG. 1E depicts the fourth stage of the example compositing stack being rendered by a traditional renderer.
Figure 1F:
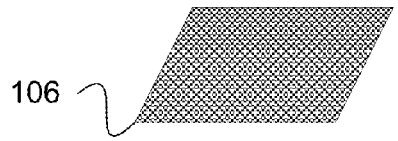
FIG. 1F depicts the fifth and final stage of the example compositing stack being rendered by a traditional renderer.

The process of compositing the layers shown in FIG. 1A using the traditional Porter and Duff method is as follows: First, as shown in FIG. 1B, the two bottom layers 105 and 104 are selected and composited together, using the associated Porter and Duff operators. This result is stored in a frame buffer 106. In a next step, as shown in FIG. 1C, the content of the frame buffer 106 is then composited with the next highest layer 103 and the result placed into the frame buffer 106 thereby updating the buffer. This process is then successively repeated, as shown in FIG. 1D and FIG. 1E. In each step, the content of the frame buffer is composited with the next highest layer, and the result of the compositing is stored in the frame buffer. Finally, as shown in FIG. 1F, there are no more layers to be composited and the result is complete and is in the frame buffer 106.

This bottom-up approach of Porter and Duff compositing illustrates the inherently serial nature of this compositing method and as such shows that traditional Porter and Duff compositing is not well suited for parallel processing in a multi-core CPU system. Although there are prior-art methods adapting the traditional Porter and Duff compositing method for parallel processing of associative compositing operations, those methods are not suitable for general, including non-associative, Porter and Duff compositing operations.

To address the shortcomings of traditional Porter and Duff compositing in the CILP arrangements, the two-layer compositing operations are expanded to N-layer compositing operations where N depends on the number of layers in the PDL and the desired level of parallelism. The number of layers M in a page is then divided into groups of at most N layers such that a page of M-layers, where M is greater than N, will have a number (being $$\left\lceil \frac{M-1}{N-1} \right\rceil$$

for M, N greater than 2) of layer groups.

For example: FIG. 2B shows a z-stack or page with 5 layers 211, 212, 213, 214 and 215. These layers are divided into two groups of 3 layers. A layer group 217, depicted in FIG. 2C, consists of layers 213, 214 and 215. A layer group 218 consists of layers 211, 212 and a virtual, place-holder layer 216 representing the result from layer group 217.

The grouping of layers and the multi-layer compositing operations allow for identifying "independent instructions" within the multi-layer compositing operation which can be computed independently of each other prior to final computation of the remaining "dependent instructions" to produce a result. Examples below are provided for 3-layer and 4-layer expansions of the compositing operations.

The ability to compute terms independently means that these independent terms for each of the groups can be computed concurrently with computing independent terms corresponding to at least one other group on a multi-processor system. Alternatively or additionally, independent terms within each group can be processed concurrently by distributing the calculations to different threads or processes of the multi-processor system. This will typically increase the speed at which multiple layers can be composited.

Further, a method of determining whether or not a layer group is substantially opaque, or otherwise does not contribute to the final result, can be used to determine the lowest layer at which to begin compositing, thereby avoiding processing layers which do not contribute to the results. This is done, for example, by evaluating independent terms in the compositing equations starting from the top most group (in a "top down" manner) prior to determining a final compositing output for at least some of the groups.

The following descriptions of compositing operations derived from traditional Porter and Duff compositing use a number of common, basic terms which will now be described to avoid unnecessary repetition.

The colour and opacity of each layer, for example 901-904, are represented in descriptions below by the following terms:

TABLE 1

Description of terms used for colour and opacity values.

| Term | Description |
| --- | --- |
| $S_0$ | The colour value of the background layer 0 (904). |
| $S_1$ | The colour value of layer 1 (903). |
| $S_2$ | The colour value of layer 2 (902). |
| $S_3$ | The colour value of layer 3 (901). |
| $S_{01}$ | The colour value result of compositing layer 0 and layer 1 (904, 903). |
| $S_{012}$ | The colour value result of compositing layer 0, layer 1 and layer 2 (904, 903, 902). |
| $S_{0123}$ | The colour value result of compositing layers 0, 1, 2 and 3 (904, 903, 902, 901). |
| $\alpha_0$ | The opacity of the background layer 0 (904). |
| $\alpha_1$ | The opacity of layer 1 (903). |
| $\alpha_2$ | The opacity of layer 2 (902). |
| $\alpha_3$ | The opacity of layer 3 (901). |
| $\alpha_{01}$ | The opacity value result of compositing layer 0 and layer 1 (904, 903). |
| $\alpha_{012}$ | The opacity value result of compositing layer 0, layer 1 and layer 2 (904, 903, 902). |
| $\alpha_{0123}$ | The opacity value result of compositing layers 0, 1, 2 and 3 (904, 903, 902, 901). |

The control coefficients X, Y and Z and the blend mode control coefficients $\beta_{f0}$ and $\beta_{f1}$ affect how the terms of the compositing equation combine to produce a result. Each coefficient value can be either 0 (zero), meaning the term it applies to does not contribute to the result or 1, meaning the term it applies to does contribute to the result.

TABLE 2

Description of control coefficients.

| Coefficient | Meaning |
| --- | --- |
| X | Controls whether the source pixel opacity and destination pixel opacity contribute to the result opacity. (X only affects the contribution to opacity.) Applies to standard two-layer Porter and Duff equations (1, 2) |
| $X_f$ | Controls whether the source 904 (layer 0) pixel opacity and destination 903 (layer 1) pixel opacity contribute to the result opacity. ($X_f$ only affects the contribution to opacity.) Applies to three and four layer Porter and Duff equations (3, 4, 12A, 13). |
| $X_g$ | Controls whether the source 904, 903 (layer 0/1 result) pixel opacity and destination 902 (layer 2) pixel opacity contribute to the result opacity. ($X_g$ only affects the contribution to opacity.) Applies to three and four layer Porter and Duff equations (3, 4, 12A, 13). |
| $X_h$ | Controls whether the source 904, 903, 902 (layer 0/1/2 result) pixel opacity and destination 901 (layer 3) pixel opacity contribute to the result opacity. ($X_h$ only affects the contribution to opacity.) Applies to four layer Porter and Duff equations (12A, 13). |
| Y | Controls whether the source pixel value and the inverse destination pixel value contribute to the result. |

TABLE 2-continued

Description of control coefficients.

| Coefficient | Meaning |
|---|---|
| $Y_f$ | Controls whether the source 904 (layer 0) pixel value and the inverse destination 903 (layer 1) pixel value contribute to the result. Applies to three and four layer Porter and Duff equations (3, 4, 12A, 13). |
| $Y_g$ | Controls whether the source 904, 903 (layer 0/1) pixel value and the inverse destination 902 (layer 2) pixel value contribute to the result. Applies to three and four layer Porter and Duff equations (3, 4, 12A, 13). |
| $Y_h$ | Controls whether the source 904, 903, 902 (layer 0/1/2) pixel value and the inverse destination 901 (layer 3) pixel value contribute to the result. Applies to four layer Porter and Duff equations (12A, 13). |
| Z | Control whether the destination pixel value and the inverse source pixel value contribute to the result. |
| $Z_f$ | Control whether the destination 903 (layer 1) pixel value and the inverse source 904 (layer 0) pixel value contribute to the result. Applies to three and four layer Porter and Duff equations (3, 4, 12A, 13). |
| $Z_g$ | Control whether the destination 902 (layer 2) pixel value and the inverse source 904, 903 (layer 0/1) pixel value contribute to the result. Applies to three and four layer Porter and Duff equations (3, 4, 12A, 13). |
| $Z_h$ | Control whether the destination 901 (layer 3) pixel value and the inverse source 904, 903, 902 (layer 0/1/2) pixel value contribute to the result. Applies to four layer Porter and Duff equations (3, 4, 12A, 13). |
| $\beta_{f0}$ and $\beta_{f1}$ | Control how the source pixel colour value and destination pixel colour value contribute to the result as defined by the compositing operator. $\beta_{f0}$ is the control coefficient (either 0 or 1) which controls whether or not $S_0$ (source/background colour) contributes to the result; and $\beta_{f1}$ is the control coefficient (either 0 or 1) which controls whether or not $S_1$ (destination colour) contributes to the result. |
| $\beta_{g0}$ and $\beta_{g1}$ | $\beta_{g0}$ and $\beta_{g1}$ are the Porter and Duff blend mode function control coefficients which describe how the result from the bottom two layers (layer 0/1) and the top layer (layer 2), of the group, contribute to the group colour result. $\beta_{g0}$ is the control coefficient (either 0 or 1) which controls whether or not the layer 0/1 result contributes to the layer group result; and $\beta_{g1}$ is the control coefficient (either 0 or 1) which controls whether or not $S_2$ (layer 2/destination colour) contributes to the result. |
| $\beta_{h0}$ and $\beta_{h1}$ | $\beta_{h0}$ and $\beta_{h1}$ are the Porter and Duff blend mode function control coefficients which describe how the result from the bottom two layers (layer 0/1) and the top layer (layer 2), of the group, contribute to the group colour result. $\beta_{h0}$ is the control coefficient (either 0 or 1) which controls whether or not the layer 0/1 result contributes to the layer group result; and $\beta_{h1}$ is the control coefficient (either 0 or 1) which controls whether or not $S_2$ (layer 2/destination colour) contributes to the result. |

The values that the control coefficients take are determined by the compositing operation and are shown in Table 3. The X column also applies to the multi-layer coefficients $X_f$, $X_g$, $X_h$. The Y column also applies to the multi-layer coefficients $Y_f$, $Y_g$, $Y_h$. The Z column also applies to the corresponding multi-layer coefficients $Z_f$, $Z_g$, $Z_h$. The $\beta_{f0}$ column also applies to the multi-layer compositing coefficient $\beta_{g0}$ and $\beta_{h0}$. The $\beta_{f1}$ column also applies to the multi-layer compositing coefficient $\beta_{g1}$ and $\beta_{h1}$.

TABLE 3

Examples of Porter and Duff Compositing Operations

| P&D Operator | X | Y | Z | $\beta_{f0}$ | $\beta_{f1}$ | Description |
|---|---|---|---|---|---|---|
| clear | 0 | 0 | 0 | 0 | 0 | None of the terms are used. |
| src | 1 | 0 | 1 | 0 | 1 | Only the terms that contribute layer 1 colour are used. |
| dst | 1 | 1 | 0 | 1 | 0 | Only the terms that contribute layer 0 colour are used. |
| src-over | 1 | 1 | 1 | 0 | 1 | The layer 1 colour is placed over the layer 0 colour. |
| dst-over | 1 | 1 | 1 | 1 | 0 | The layer 0 colour is placed over the layer 1 colour. |
| src-in | 1 | 0 | 0 | 0 | 1 | The layer 1 that overlaps layer 0, replaces layer 0. |
| dst-in | 1 | 0 | 0 | 1 | 0 | The layer 0 that overlaps layer 1, replaces layer 1. |
| src-out | 0 | 0 | 1 | 0 | 1 | The layer 1 that does not overlap layer 0 replaces layer 0. |
| dst-out | 0 | 1 | 0 | 1 | 0 | The layer 0 that does not overlap layer 1 replaces layer 1. |
| src-atop | 1 | 1 | 0 | 0 | 1 | The layer 1 that overlaps layer 0 is composited with layer 0. |
| dst-atop | 1 | 0 | 1 | 1 | 0 | The layer 0 that overlaps layer 1 is composited with layer 1 and replaces layer 0. |
| xor | 0 | 1 | 1 | 0 | 0 | The non-overlapping regions of layer 1 and layer 0 are combined. |

Traditional Two-Layer Porter and Duff Compositing

The two-layer Porter and Duff compositing operations consist of two operations, namely an operation which calculates the accumulated opacity of the two layers (1), and an operation which calculates the pre-multiplied result colour value of the two layers (2). Equations (1) and (2) are the two basic Porter and Duff compositing operations which are well understood by those skilled in the art. The descriptions that follow will build upon these two basic equations to demonstrate how these equations can be expanded to work on more than two layers.

These operations take the following forms:

$$\alpha_{01} = X\alpha_0\alpha_1 + Y\alpha_0(1-\alpha_1) + Z\alpha_1(1-\alpha_0) \quad (1)$$

$$\alpha_{01}S_{01} = Y\alpha_0 S_0(1-\alpha_1) + Z\alpha_1 S_1(1-\alpha_0) + \alpha_0\alpha_1 f(S_0, S_1) \quad (2)$$

Where:
$\alpha_{01}S_{01}$ is the pre-multiplied colour result for the two layer Porter and Duff compositing equation (2).
$f(S_0, S_1)$ is the blend mode function which defines how the layer 0 (source) and layer 1 (destination) colours are combined. The blend mode function $f(S_0, S_1)$ is controlled by parameters $\beta_{f0}$ and $\beta_{f1}$, which can be either 0 or 1, as defined below:

$$f(S_0, S_1) = \beta_{f0} S_0 + \beta_{f1} S_1 \quad (2A)$$

The remaining parameters are described in Table 1 and Table 2.

The blend mode function $f(S_0, S_1)$ is shown in equation (2A) as a linear function for simplicity. The blend mode function defines how two colours are to be combined. The blend mode function $f(S_0, S_1)$ may be linear or non-linear depending upon the compositing operation being applied. The following explanations will use this linear blend mode function (2A) for simplicity, however, anyone skilled in the art can follow this procedure and substitute a non-linear blend mode function, for example corresponding to "multiply" blend mode.

The values of the blend mode function control coefficients X, Y, Z, $\beta_{f0}$ and $\beta_{f1}$ are determined by the Porter and Duff Porter and Duff operator specified in the PDL script. Table 3 above lists the values of the control coefficients for each compositing operator supported by traditional two-layer Porter and Duff compositing.

Three Layer Porter and Duff Compositing

The traditional two-layer Porter and Duff compositing formula can be generalised to multi-level compositing.

Figure 2A:
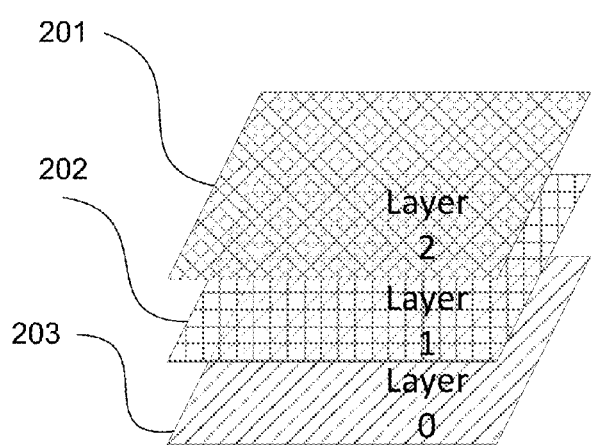
FIG. 2A depicts a three layer compositing group.
Figure 2B:
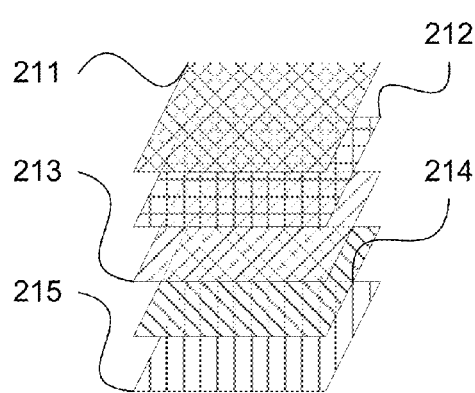
FIG. 2B depicts an example compositing stack.
Figure 2C:
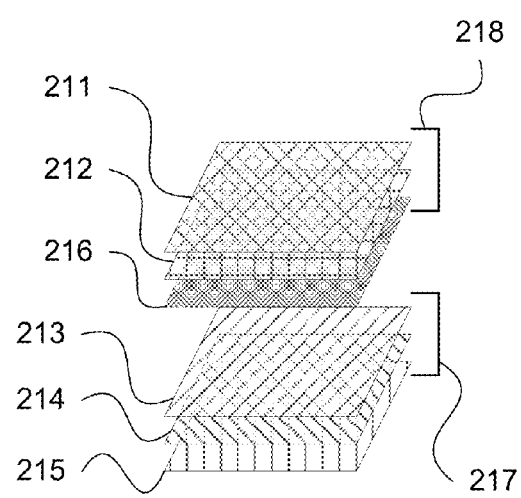
FIG. 2C depicts the example compositing stack divided up into three layer compositing groups.

For example, the case of three level compositing is shown in FIG. 2A. There are three-layers, the background layer 0 (203), layer 1 (202) and the upper layer 2 (201).

Expanding equations (1) and (2) to three levels gives: equation (3) which calculates the accumulated opacity of the three levels; and equation (4) which calculates the resultant pre-multiplied colour value for three levels. Equation (4) is in terms of the results from equations (1) and (2). Equations (3) and (4) are:

$$\alpha_{012} = \alpha_0(Y_f(X_f Y_f Z_f)\alpha_1)(Y_g + (X_g - Y_g - Z_g)\alpha_2)\alpha_2 Z_f(Y_g + (X_g - Y_g - Z_g)\alpha_2) + \alpha_2 Z_g \quad (3)$$

$$\alpha_{012}S_{012} = Y_g(1-\alpha_2)\alpha_{01}S_{01} + Z_f(1-\alpha_{01})\alpha_2 S_2 + \alpha_{01}\alpha_2 g(S_{01}, S_2) \quad (4)$$

Where:
$g(S_0, S_1)$ is the blend mode function which defines how the layer 0, 1 (source) and layer 2 (destination) colours are combined.

Substituting equation (2) for $\alpha_{01}S_{01}$ in equation (4) expands the equation to give the three level pre-multiplied result in terms of the three source level colour and opacity values giving equation (5):

$$\alpha_{012}S_{012} = Y_f Y_g(1-\alpha_1)(1-\alpha_2)\alpha_0 S_0 + Z_f Y_g(1-\alpha_0)(1-\alpha_2)\alpha_1 S_1 + Z_g(1-\alpha_{01})\alpha_2 S_2 + Y_g(1-\alpha_2)\alpha_0\alpha_1 f(S_0, S_1) + \alpha_{01}\alpha_2 g(S_{01}, S_2) \quad (5)$$

Where:
$f(S_0, S_1)$ a blend mode function defined in PDL for compositing the layer 0 colour value $S_0$ and layer 1 colour value $S_1$.
$g(S_{01}, S_2)$ is a blend mode function defined in PDL the layers 0/1 and layer 2 applied to a colour value $S_2$ of layer 2 and a colour value $S_{01}$ resulting from compositing layers 0 and 1.

The remaining terms of equation 5 are explained in Table 1, Table 2 and Table 3.

For Porter and Duff compositing, the blend mode functions $f( )$ and $g( )$ can be replaced by the following substitutions:

$$f(S_0, S_1) = \beta_{f0} S_0 + \beta_{f1} S_1 \quad (6)$$

$$g(S_{01}, S_2) = \beta_{g0} S_{01} + \beta_{g1} S_2 \quad (7)$$

Then equation 5 can be expanded by substituting (7) for $g(S_{01}, S_2)$ and then substituting (2) for $\alpha_{01}S_{01}$, (1) for $\alpha_{01}$ and (6) for $f(S_0, S_1)$ in the resulting equation, giving a foreground compositing model for 3 layer compositing as follows:

$$\alpha_{012}S_{012} = \alpha_0 S_0(Y_f - Y_f\alpha_1 + \alpha_1\beta_{f0})(Y_g - Y_g\alpha_2 + \alpha_2\beta_{g0}) + \\ \alpha_0\{\alpha_1 S_1(\beta_{f1} + Z_f)(Y_g - \alpha_2 Y_g + \alpha_2\beta_{g0}) + \\ \alpha_2 S_2(\beta_{g1} + Z_g)(Y_f + (X_f - Y_f - Z_f)\alpha_1)\} + \\ \{-\alpha_1 S_1 Z_f(Y_g - \alpha_2 Y_g + \alpha_2\beta_{g0}) + \alpha_2 S_2(\alpha_1 Z_f Z_g + \alpha_1 Z_f\beta_{g1} - Z_g)\} \quad (8)$$

Where:
$\alpha_0 S_0$, $\alpha_1 S_1$ and $\alpha_2 S_2$ are the pre-multiplied colour values for the layer 0, layer 1 and layer 2 image pixels respectively.
$\alpha_{01}S_{01}$ is the pre-multiplied colour result for the two layer Porter and Duff compositing equation.
$\alpha_{012}S_{012}$ is the pre-multiplied colour result for the three layer Porter and Duff compositing equation.

In a similar way as was done for the two level compositing equations, the Porter and Duff compositing operators specified in the input PDL script are used to set the values for the coefficients defined in Table 2.

Compared to the traditional 2-level Porter and Duff equation, the 3-level compositing equation has many sub-expressions, which are independent of the bottom layer's colour value and transparency.

To identify the independent sub-expressions of equation (8), first identify sub-expressions of equation (8) based on parenthesis, i.e. in accordance with rules for performing arithmetic operations "+" and "*". Then the sub-expressions are classified as either containing only terms independent of the background or comprising at least one term dependent on the background.

Given that "+" and "*" are both associative and commutative operations for all integer numbers, the order in which the sub-expressions within each group are evaluated does not affect the result. In the follow description of mathematics, a "term" is defined as either a single number or variable, or the product of several numbers or variables as normally defined in mathematics. "Operators" are mathematical operators such as "+", "−", etc. An "expression" is a combination of multiple terms and operators. A "sub-expression" is an expression which is a sub-part of a previously defined expression. Next, identify the terms in each sub-expression which are dependent on the background colour and opacity. These dependent background terms are represented by $\alpha_0$ and $_0S_0$ in equation (8). Sub-expressions which have no background terms can be immediately declared to be independent sub-expressions. For example, equation (8aa) is a sub-expression of (8) which is dependent on the background due to the term $\alpha_0 S_0$.

$$\alpha_0 S_0 (Y_f - Y_f + \alpha_1 \beta_{f0})(Y_g - Y_g \alpha_2 + \alpha_2 \beta_{g0}) \quad (8aa)$$

The sub-expression (8aa) is composed of both a dependent term (8ab) and an independent sub-expression (8a):

$$\alpha_0 S_0 \quad (8ab)$$

$$(Y_f - Y_f \alpha_1 + \alpha_1 \beta_{f0})(Y_g - Y_g \alpha_2 + \alpha_2 \beta_{g0}) \quad (8a)$$

The following shows the independent sub-expressions that can be derived from (8) as a result of applying the method described. The derived independent sub-expressions are indep1 (8a), indep2 (8b), indep3 (8c), indep4 (8d) and indep5 (8e). These sub-expressions are independent of the background and independent of each other sub-expression result. The independent sub-expressions can be computed while waiting for the background result and, therefore, sub-expression (8a) can be scheduled ahead of (8ab):

$$indep1 = (Y_f - Y_f \alpha_1 + \alpha_1 \beta_{f0})(Y_g - Y_g \alpha_2 + \alpha_2 \beta_{g0}) \quad (8a)$$

$$indep2 = \alpha_1 S_1 (\beta_{f1} + Z_f)(Y_g - \alpha_2 Y_g + \alpha_2 \beta_{g0}) \quad (8b)$$

$$indep3 = \alpha_2 S_2 (\beta_{g1} + Z_g)(Y_f + (X_f - Y_f - Z_f)\alpha_1) \quad (8c)$$

$$indep4 = \alpha_1 S_1 Z_f (Y_g - \alpha_2 Y_g + \alpha_2 \beta_{g0}) \quad (8d)$$

$$indep5 = \alpha_2 S_2 (\alpha_1 Z_f Z_g + \alpha_1 Z_f \beta_{g1} - Z_g) \quad (8e)$$

Where:
indep1-indep5 are the results of the independent sub-expressions.
All other terms are explained in Table 1, Table 2 and Table 3.

The result of the three-layer compositing equation (8) can now be expressed as an equation (8f) in terms of the results from the independent sub-expressions (8a), (8b), (8c), (8d), (8e), the background pre-multiplied colour value (8ab) and background opacity value (8ac):

$$\alpha_0 \quad (8ac)$$

$$\alpha_{012} S_{012} = \alpha_0 S_0 (indep1) + \alpha_0 (indep2 + indep3) - indep4 + indep5 \quad (8f)$$

Where:
indep1-indep5 are the results of the independent sub-expressions.
All other terms are explained in Table 1, Table 2 and Table 3.

The independent sub-expressions (8a), (8b), (8c), (8d) and (8e) are examples of independent instructions (1441, 1442, 1443, 1444, 1445) and the dependent expression (8f) is an example of the dependent instruction (1412) which combines the results from the independent instructions (1441, 1442, 1443, 1444, 1445) of the current layer group (1433) and the result from the dependent instruction (1402) from the previous layer group (1432) to calculate the result for the dependent instruction (1412) from the current layer group (1433). This process can be repeated up through the layer groups of the z-stack, using the result from the lower layer group to finalise computation of the dependent instruction for the upper layer group.

Given that all identified sub-expressions (8a), (8b), (8c), (8d) and (8e) are very simple and are easy to implement on a GPU or any other graphics circuit, i.e. multiple cores can be adapted (programmed) to perform particular calculations. For example, one GPU kernel can be adapted for executing sub-expression (8a) for a plurality of pixels in the image and a particular group of layers, while another GPU kernel is configured for sub-expressions (8b). Thus, sub-expressions (8a), (8b), (8c), (8d) and (8e) within each layer group can be evaluated in parallel with each other.

It should be noted, that different level of granularity can be chosen for identifying sub-expressions. If finer granularity is chosen, then sub-expressions can be prioritised depending on a number of times it is used in the compositing model (8). For example, given that sub-expressions, eg. $(Y_g - Y_g \alpha_2 + \alpha_2 \beta_{g0})$, $\alpha_2 S_2$ and $\alpha_1 S_1$, are used multiple times, they can be prioritised over other sub-expressions, such as $(Y_f - Y_f \alpha_1 + \alpha_1 \beta_{f0})$, $(\beta_{f1} + Z_f)$, $(\beta_{g1} + Z_g)$.

Where there is no lower layer group, suitable values are supplied for the background pre-multiple colour (8ab) and opacity (8ac) by the page description language. These values are used directly in the dependent instruction (1402) of the bottom layer group (1432). The set of equations (8a)-(8f) can be regarded as one example of a "foreground compositing model" (also referred to merely as a "compositing model").

Sub-expressions may be adapted for specific processors, for example, scheduling specific instructions to operate on a particular core of a CPU in order to take advantage of cached locality of data in memory. Another method is to adapt the sub-expressions for execution on a GPGPU where a GPGPU compute kernel operates on a large amount of similar terms.

Figure 15A:
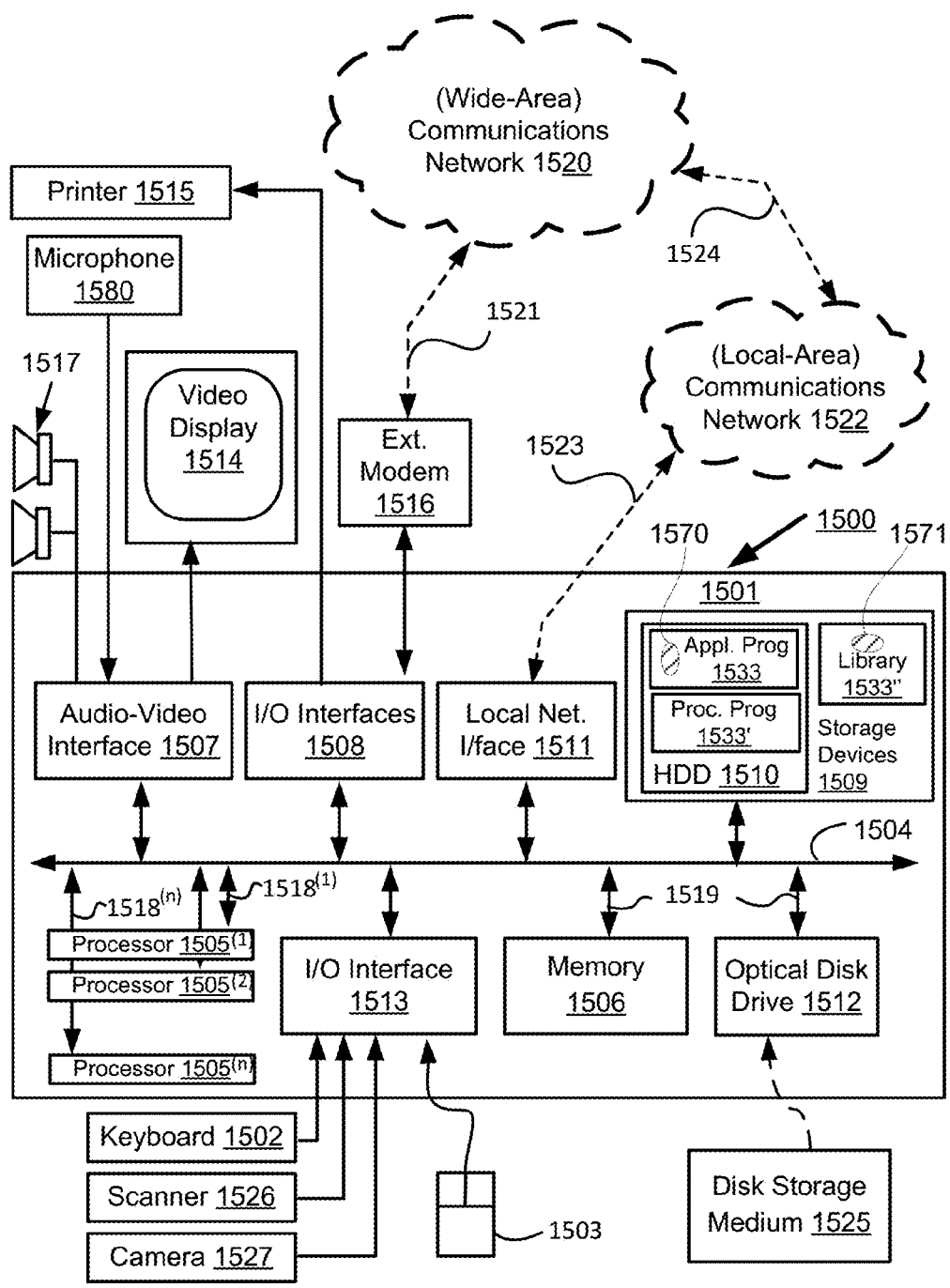
FIGS. 15A and 15B form a schematic block diagram of a general purpose computer system upon which CILP arrangements described can be practiced.
Figure 15B:
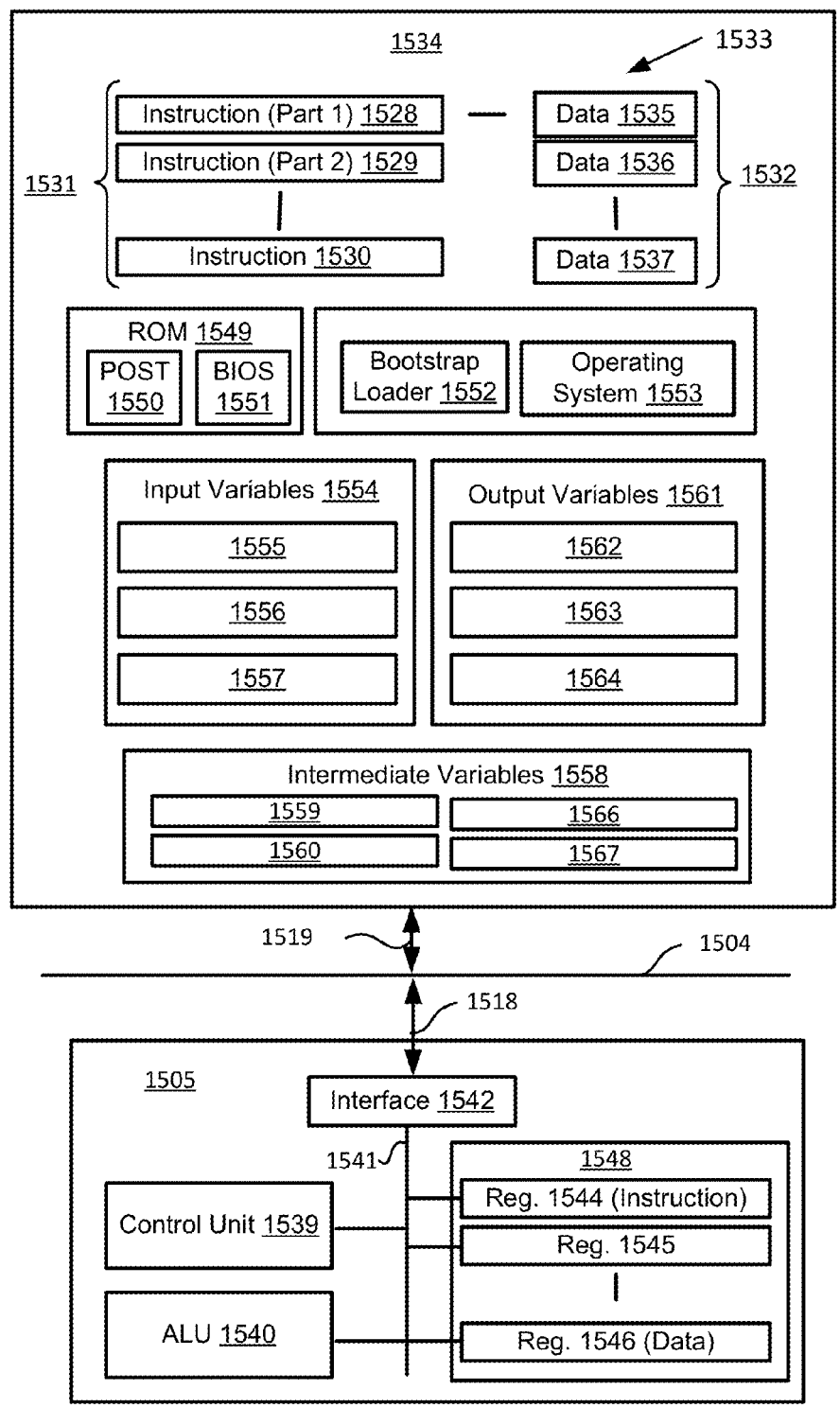

FIGS. 15A and 15B depict a general-purpose multi-core computer system 1500, upon which the various CILP arrangements described can be practiced.

As seen in FIG. 15A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes a plurality processors 1505$^{(1)}$, 1505$^{(2)}$, . . . , 1505$^{(n)}$ (ie cores) for executing an application software program 1533 (such as the CILP compositing arrangement of FIG. 3) scheduled by an operating system scheduler 1533', and a memory unit 1506. The processors 1505$^{(n)}$ can each be configured to execute one or more processing threads. Particularly, the processors 1505$^{(n)}$ may include CPUs and GPUs. The operating system scheduler 1533' may form part of an operating system 1553, described hereinafter in more detail with reference to FIG. 15B. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet circuit card, a Bluetooth® wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processors $1505^{(1)}$, . . . , $1505^{(n)}$ are coupled to the system bus 1504 using respective connections 1518(1) . . . 1518(n). Likewise, the memory 1506 and optical disk drive 1512 are coupled to the system bus 1504 by connections 1519. Examples of computers on which the described arrangements can be practised include IBM-PC's and compatibles, Sun Sparcstations, Apple Mac™ or a like computer systems.

The CILP method may be implemented using the computer system 1500 wherein the processes of FIGS. 3-8 and 10-12, to be described, may be implemented as CILP code 1570 embedded as part of the application program 1533 executable within the computer system 1500. The scheduling of tasks performed in the aforementioned processes of FIGS. 3-8 and 10-12 onto the cores $1505^{(1)}$, . . . , $1505^{(n)}$ may be implemented using the operating system scheduler 1533' executable within the computer system 1500.

In particular, in one CILP arrangement referred to as an "embedded CILP arrangement", the steps of the CILP method are effected by instructions 1531 in the code 1570 that are incorporated (embedded) into the software 1533. These steps are carried out within the computer system 1500. In this implementation, the CILP arrangement software code is incorporated directly into the application software program 1533 and is present in the software 1533 when it is acquired by a user. Thus for example according to this arrangement, a user can either purchase a "standard" version of a compositing program 1533 or a CILP version of the compositing program 1533, only the latter being configured to perform the CILP methods. In another CILP arrangement, the code 1571 can reside in a library 1533", and an application software program, written specifically to support a CILP library, makes use of a library API to perform the CILP methods. Upon installing or running the multi-threaded compositing program that is written specifically to support the CILP library, the CILP arrangement software code in the library can be linked to the multi-threaded print compositing program, thus converting the multi-threaded compositing program that is written specifically to support the CILP library, which cannot without the library perform the CILP methods, to a "library based" CILP version of the print compositing program, which is configured to perform the CILP methods.

The software instructions 1531 may be formed as one or more code modules, each for performing one or more particular tasks. The software may also be divided into two separate parts, in which a first part and the corresponding code modules performs the CILP methods and a second part and the corresponding code modules manage a user interface between the first part and the user.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous CILP apparatus.

The software 1533, 1533' and 1533" is typically stored in the HDD 1510 or the memory 1506. The software is loaded into the computer system 1500 from a computer readable medium, and executed by the computer system 1500. Thus, for example, the software 1533, 1533' and 1533" may be stored on an optically readable disk storage medium (e.g., CD-ROM) 1525 that is read by the optical disk drive 1512. A computer readable medium having such software or computer program recorded on it is a computer program product. The use of the computer program product in the computer system 1500 preferably effects a CILP apparatus.

In some instances, the application programs 1533, 1533' and 1533" may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533, 1533' and 1533" and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processors 1505$^{(1)}$, . . . , 1505$^{(n)}$, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548. The memory 1548 typically includes a number of storage registers 1544-1546 in a register section. Registers are wired into the CPU core and accessed by the execution units. Cache memory is not directly accessed by the execution units and data in cache memory still needs to be loaded into registers before instruction execution. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1105 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The disclosed CILP arrangements use input variables 1554, which are stored in the memory 1534 in corresponding memory locations 1555, 1556, 1557. The CILP arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises:

a fetch operation, which fetches or reads an instruction 1531 from a memory location 1528, 1529, 1530;
  a decode operation in which the control unit 1539 determines which instruction has been fetched; and
  an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 3-8, 10-12, is associated with one or more segments of the program 1533 and is performed by the register section 1544, 1545, 1547, the ALU 1540, and the control unit 1539 in the processor 1505 working together to perform the fetch, decode, and execute cycles for every instruction in the instruction set for the noted segments of the program 1533.

The CILP method may alternatively be implemented in dedicated hardware such as one or more integrated circuits performing the CILP functions or sub functions. Such dedicated hardware may include graphic processors, digital signal processors, or one or more microprocessors and associated memories.

As previously noted, once the result for the independent instructions (8a), (8b), (8c), (8d) and (8e) have been computed, the dependent instruction result can be calculated using (8f). This process can be repeated up through the layer groups of the z-stack, using the result from the lower layer group to finalise computation of the dependent instruction for the upper layer group.

As an example, consider a z-stack of 7 layers each comprising associated image data as shown in FIG. 13A. These 7 layers are divided into three groups 1311, 1312, 1313. The groups 1311 and 1312 can each be regarded as a foreground group. The group 1313 can be regarded as a background group. Each group has 3 layers, group 1313 has layers 1305, 1306 and 1307. Group 1312 has layers 1303, 1304 and the virtual layer 1322. Group 1311 has layers 1301, 1302 and the virtual layer 1321.

FIG. 14 illustrates the scheduling of the independent and dependent instructions needed to calculate a result for the group of 7 layers 1301-1307. FIG. 14 is based on a multi-processor system such as that depicted in FIGS. 15A, 15B with 4 CPUs (depicted as $1505^{(1)}$-$1505^{(4)}$ in FIG. 15A) and can process 4 instructions concurrently. As shown above, to compute the result for a 3-layer group, the five independent instructions (8a), (8b), (8c), (8d) and (8e) must be computed prior to being able to combine the results from these independent instructions with the background layer to compute the result for the layer group. Additionally, instead, or in addition to CPUs, multiple GPUs can be used.

A set 1432 of five independent instructions (1441-1445) for the layer group 1313 are depicted in a dashed rectangle 1401. Since there are only 4 CPUs available, and five independent instructions, four of the instructions are scheduled by the scheduler 1533' in FIG. 15A to compute first, in a time slot depicted by 1431. In the case of a general purpose multi-processor system, the independent instructions may allocated for execution by available threads or processors in a queue of instructions in any order such that the independent instructions for the first layer group (ie the background group 1313 in the example depicted in FIGS. 13 and 14) are guaranteed to be scheduled (ie executed) not later than the independent instructions for the second layer group (ie the foreground group 1312 in the example depicted in FIGS. 13 and 14). For example, the independent instructions for the first layer group (ie the background group 1313) can be scheduled either before the independent instructions for the second layer group (ie the foreground group 1312 in the example depicted in FIGS. 13 and 14), or substantially simultaneously if there are enough computational resources, eg. available threads or processors. As each independent instruction completes, the result of the independent instruction is held in a buffer/register/cache (such as 1447). Once a first of this set 1432 of independent instructions completes execution, producing corresponding computation results such as 1447, the fifth independent instruction 1445 in the set 1432 is scheduled for execution in a subsequent time slot 1446. As the other instructions in the set 1432 complete execution, a set 1433 of five independent instructions 1441-1445 from the next layer group 1312 can begin being scheduled by the scheduler 1533' in the same time slot 1446.

Once the set 1432 of independent instructions 1441-1445 for the layer group 1313 have completed execution, a dependent instruction 1402 uses results such as 1447 from the independent instructions 1441-1445 which produces a result 1448 can be executed. Once the set 1433 of independent instructions 1441-1445 for the layer group 1312 complete execution and the dependent instruction 1402 completes execution, a dependent instruction 1412 for the layer group 1312 can be executed dependent upon results from execution of the independent instructions 1441-1445 and the result 1448 from execution of the dependent instruction 1402.

Similarly a final set 1434 of independent instructions 1441-1445 for the layer group 1311 has to wait for the independent instructions 1441-1445 to complete execution and for a result 1449 to be available from the dependent instruction 1412 before a dependent instruction 1422 can execute and produce the final result.

The order in which a set of independent instructions 1441-1445 within a layer group 1432 are scheduled does not matter, that is instructions 1445, 1444, 1443, 1442 can be schedule in the first time slot 1431, and then instruction 1441 can be scheduled in the next time slot 1446. It is important however, that the layer group instructions are scheduled such that instructions in lower or background layer groups are given priority over instructions in foreground layer groups.

Independent instructions from foreground layer groups such as 1433 should only be scheduled in a timeslot such as 1446, if there are available processing resources after the final instructions 1445 from the background layer group 1432 have been scheduled.

Procedure for using the Three Layer Porter and Duff Compositing Equations

The three level Porter and Duff equations presented above are used to composite a z-stack of layers. This procedure will be described with reference to FIGS. 13A-13E.

The z-stack of layers 1300 illustrated in FIG. 13A, has a topmost layer 1301 and layers 1302 through to the bottom layer 1307. The layer 1307 is the first fully opaque layer, so any layers below this (1308 and 1309) do not contribute to the final output.

The z-stack is then divided into multiple groups of three layers. The bottom group 1313 is composed of the three bottom layers (1305, 1306 and 1307). For every group above that, 1311 and 1312, the top two layers of the group come from the z-stack 1300 and the bottom layer of the group is a virtual layer, a place holder, which will contain the computed result of the group immediately below the current group.

For example, in FIG. 13B the group 1311 consists of layers 1301 and 1302 (from the z-stack 1300) and a virtual layer 1321. The group 1312 consists of the layers 1303, 1304 and a virtual layer 1322.

FIG. 13B shows how the z-stack 1300 of layers depicted in FIG. 13A is divided into groups. The first group 1313 is composed of the bottom most layer 1307, the next layer 1306 and the layer above that 1305.

The second group 1312 is then created. The lowest layer of this new group is the virtual layer 1322 which is a place-holder and can act as a frame buffer. Since the CLIP arrangements involve a pixel-wise compositing routine, a frame buffer is typically not used. Instead, since the instructions are pixel-wise, the intermediate results are typically be stored in registers or cache memory as compositing proceeds up the z-stack. In order to contain, as depicted by a dashed arrow 1352, a computed result 1332 of the lower group 1313, once the lower group 1313 has finished compositing. The second layer of the group 1312 is the layer 1304, and the top layer of the group is the layer 1303. Since the compositing is performed in parallel, the elements of the compositing equation which are independent of the virtual layer 1322 can be computed before the result 1332 of the lower group 1313 is ready.

Creation of groups continues in a similar manner to that of the group 1312 until all layers which contribute to the result have been grouped. Note that the top-most group 1311 may only have two layers. In the example in FIG. 13A the top most group 1311 consists of the virtual layer 1321 and the layers 1302 and 1301.

Processing of the groups is done in two passes. The two-pass approach is essential in determining the uppermost opaque layer group, that is the layer group that will be the background layer group for the purpose of compositing. In situations where the background layer group is somehow indicated in the PDL, then the first pass could be skipped and processing starting at the indicated background layer group. Another option is to not determine an opaque layer and just composite everything, this will be less efficient however. In a first pass (see a dashed arrow 1353 in FIGS. 13A-13E), groups are processed in order down the z-stack, top-most group first, bottom-most group last to determine the top-most opaque level in the z-stack. Since the instructions (8a), (8b), (8c), (8d) and (8e) which execute while descending the z-stack are independent of the background layer of each group, the processing of layer groups can be scheduled in parallel.

For each group, the following operations are performed:
1. Based on the composition operator (see column 1 from the left of Table 1) specified by the PDL interpreter for the composition of the group layers 0/1 and layers 1/2, determine the correct control coefficients (see columns 2-4 from the left of Table 1) to use for the 3-layer Porter and Duff compositing operation (recall that for the example of three level compositing shown in FIG. 2A there are three-layers namely the background layer 0 (203), layer 1 (202) and the upper layer 2 (201).).
2. Compute all terms in the compositing formula that DO NOT depend on the virtual layer of the group (i.e. layer 0 within the group). In other words, compute the terms (8a), (8b), (8c), (8d) and (8e) that are independent of the result of the group below the current group. This is illustrated in FIG. 14 where the set 1432 of independent terms 1441-1445 in the dashed rectangle 1401 are scheduled before the dependent term 1402.
3. Determine if the layer group is opaque (i.e. if the background layer (layer 0) of the group does not contribute to the result.) This can be determined from the independent terms calculated in the step (2) above. The full method for determining if the layer group is opaque is described below. If the group result is opaque, then mark the group as opaque and stop processing of groups below the current group.
4. If this is the final group, then the group layer 0 (ie 1307) is not virtual and the group compositing can be finalised by calculating the terms that depend on the group layer 0 and calculating the final result 1332 for this group.

In the second pass, the bottom group/opaque group has been finalised (the compositing for the group is complete) and has the single opaque layer result 1332. The groups are now processed starting at the bottom-most group with a virtual group layer (the group above the previously finalised group). In this bottom-up composition pass through the z-stack, the independent terms for each group would have been calculated concurrently, however, the order executing dependent instructions is sequential. Given that some of independent terms for the layer groups would have been pre-calculated, the pre-calculated independent terms can be reused to finalise compositing calculations as described below.

For each of the remaining groups, the following operations are performed with reference to FIG. 13C for example:

1. Replace the virtual group layer 0 (ie 1322) with the result 1332 from the group below.
2. Complete the calculation of the group results, by computing all remaining terms that include layer 0 (ie 1322) and then combining all of the independent terms 1331 to produce a final result 1342 for the group.

When the second pass completes, the final computed result 1351 of the top-most group will be the computed pixel value.

Detailed Description of Scheduling Instructions

FIG. 14 illustrates the scheduling of dependent (8f, 1402) and independent instructions (eg the terms which are expressed as the equations (8a)-(8e)) and layer groups when compositing a z-stack of layers. The reference numeral 1432 represents a set of instructions associated with the group 1313 of layers for layers 0, 1 and 2. The reference numeral 1433 represents a set of instructions associated with the group 1312 of layers for layers 3, 4 and the virtual layer representing an output of compositing the layer group 1313 using the instructions 1432. The reference numeral 1434 represents the set of instructions associated with the group 1311 of layers 5, 6 and the virtual layer representing the result of compositing the layer group 1312 using the instructions 1433.

The dependent instructions (8f) are shown as cross-hatched boxes 1402, 1412 and 1422. The independent instructions (8a), (8b), (8c), (8d) and (8e) are shown as the boxes numbered 1441, 1442, 1443, 1444 and 1445 respectively. These instructions are repeated as depicted by the dashed boxes 1401, 1411 and 1421 for each layer group.

The small box 1447 depicts the register, cache or memory buffer which holds a result 1452 of the independent instructions. The small boxes 1448, 1449, 1450 depict the register, cache or memory buffer which hold respective results 1453, 1454 and 1458 of the dependent instructions 1402, 1412, 1422.

The vertical regions 1431 and 1446 are indicative of some unit of time (also referred to as "time slots" or "slots") in which instructions are scheduled by the scheduler 1533' in FIG. 15A. FIG. 14 illustrates scheduling for a 4-processor system and as such only 4 instructions are scheduled for each time unit 1431.

The dependency lines such as 1451 show the dependency between instructions, e.g. the dependent instruction 1412 depends on outputs from the independent instructions 1411 for the layer group 1312 associated with the set 1433 of instructions, as well as the output (or result) 1448 of the dependent instruction 1402 which in turn depends upon outputs from the set 1432 of independent instructions associated with the layer group 1313.

In the first time slot 1431, the set 1401 of independent instructions (8a) (ie 1441), (8b) (ie 1442), (8c) (ie 1443) and (8d) (ie 1444) for the first layer group 1313 are scheduled. Once one of those instructions completes, (8e) (ie 1445) can be scheduled. Once other instructions complete, independent instructions (i.e. 1411) from the set 1433 for the next layer group can begin being scheduled. The instructions 1441, 1442, 1443, 1444 and 1445 of the first layer group 1432 (ie 1313 in this example) can be scheduled in any order. The only constraint is that all the independent instructions for the first layer group are scheduled before the dependent instruction 1402 or any instruction for any subsequent layer group.

Once (8e) (ie 1445) from the first layer group 1313 (ie the background group in this example) completes and all other instructions (8a), (8b), (8c) and (8d) from the first layer group 1313 have completed, the dependent instruction (8f) (ie 1402) that produces the result 1448 for the layer group 1313 associated with the set 1432 of independent instructions 1401 can be scheduled.

As the dependent instruction (8f) (ie 1402) is processing and the set 1411 of independent instructions for the layer group 1312 complete, the remainder (ie 1444-1445) of the independent instructions in the set 1433 for the layer group 1312 are scheduled followed by the scheduling of instructions for the set 1434 of independent instructions for the layer group 1311.

Once the set 1401 of independent instructions for the layer group 1313 has finished, the dependent instruction 1402 and the set 1411 of independent instructions for the layer group 1312 have completed, the dependent instruction 1412 for the layer group 1312, which depends on the independent instructions 1411 for the layer group 1312 as well as the output 1448 of the dependent instruction 1402 for the layer group 1313 can be scheduled.

Similarly, once the independent instructions 1421 in the set 1434 of instructions for the layer group 1311 have completed and the dependent instruction 1412 for the layer group 1312 has completed, then the dependent instruction 1422 for the layer group 1311 can be scheduled.

FIG. 14 illustrates one possible scheduling of these instructions given a 4-core multi-processor system such as that depicted in FIGS. 15A and 15B. Instructions independent of the background layer in a layer group can be scheduled any time depending on CPU resources, however, it is best to schedule them in such a way so that the dependent instructions such as 1402 and 1412 can complete and the layer group such as 1313 associated with the set 1432 of instructions can provide a suitable background for the virtual layer in the set 1433 of instructions waiting for it.

While it is shown in the example in FIG. 14 that the independent instructions 1401 and the dependent instruction 1402 for the layer group 1313 associated with the set 1432 of instructions are done concurrently with the independent instructions 1411 associated with the set 1433 of instructions for the layer group 1312, this is just one example. Which instructions execute in parallel with which other instructions will depend on the target system and parallelism. In some arrangements those calculations can be scheduled to run in parallel depending on available processing resources. For example, on GPU it may be more efficient to execute the instructions 1401 and the instructions 1411 in parallel.

Determination of Number of Layers in a Group

Descriptions of the division of layers in the z-stack into layer groups in this specification so far has focused on using 3-layers. Multi-processor examples have used 4-processors to illustrate scheduling. The choice of 3-layers and 4-processors is illustrative only, and has been selected for description for simplicity due to the complex mathematics involved in illustrating the validity of 3-layer compositing according to the CILP arrangements, and the complexity of illustrating multi-processor scheduling.

In practice there is no need to limit the layer groups to 3-layers or the multi-processor scheduling to 4-processors. Currently general purposes CPUs have up to 16 processor cores and multiprocessor systems with multiple CPUs are common. This CILP arrangement describes a per-pixel processing process and PDL pages consist of many millions of pixels, as such the CILP methods described here are ideally suited to GPU implementations where GPU have hundreds of cores for massive data-parallel processing. For example, GPU kernels may be adapted for executing dependent and independent instructions on a pixel basis under control of the scheduler 1533'.

Just as the traditional two-layer Porter and Duff compositing operations have been expanded to 3-layer compositing operations in the described CILP arrangements, so too can the equations be expanded to 4-layer (shown below) or any arbitrary number of layers.

For multi-processor systems the number of layers chosen for each layer group may depend on the number of processors available or some ratio of the number of processors available. For example, for a two CPU system with 32 core a 32 layer expansion of the compositing equation will not be practical, however, 8 groups of 4 layers each being processed concurrently is practical.

Alternatively, the number of layers in a layer group may be chosen based on the number of independent terms that the N-layer equation produces. For example, three layers compositing can be decomposed into at least 5 independent instructions (8a), (8b), (8c), (8d) and (8e) and at least one dependent instruction (8f).

To achieve good performance and minimise data starvation of CPU cores, the number of independent instructions for a layer group should be greater than the number of available threads by 10-20% to compensate for the different execution time of the scheduled instructions. That is having slightly more independent instructions than the number of threads makes better use of the multiprocessor system by ensuring greater CPU utilisation. Having a precisely 1:1 relationship between the number of independent instructions and the number of threads is a bare minimum and will result is some slight starvation of the CPU as the dependent instruction waits for all independent instructions to complete.

The number of independent instructions available for scheduling is also dependent on the complexity of the compositing operation or, in this case, the number of layers of the compositing operation. Should the number of threads available be large, such a 16 or 32 core system, then the number of layers in the compositing operation needs to increase from 3 to 4 or 5 layers to supply enough independent instructions. This is done under the assumption that more layers in a group generally provide more independent instructions to be processed in parallel.

Similar analysis is also applicable to GPUs, in consideration of GPU kernels, which are able to work in parallel, instead of parallel threads.

Detection of Opaque Group Result

While it is possible, using the disclosed CILP arrangements, to process every layer group to produce a final result, it is not always necessary. There are situations where the layers below a certain layer do not contribute to the result due to the effects of opacity, compositing operator or blend mode. Processing time can be saved if layers, and therefore layer groups, can be determined to be opaque and layer groups below an opaque layer group are not processed.

The result of a layer group is determined to be fully opaque if the background layer makes no contribution to the result of the group. This is significant since this means that a layer group can have its opaqueness determined BEFORE the background layer for that group has been composited and made available, thereby removing the need to process the layer groups below.

By examination of equation (8), it can be seen that the background layer makes no contribution to the result if the following background layer contribution determination equations 9 & 10, derived from sub-equations (8a), (8d) and (8e), are true:

$$(Y_f - Y_f\alpha_1 + \alpha_1\beta_{f0})(Y_g - Y_g\alpha_2 + \alpha_2\beta_{g0}) = 0 \quad (9)$$

$$\alpha_1 S_1(\beta_{f1} + Z_f)(Y_g - \alpha_2 Y_g + \alpha_2\beta_{g0}) + \alpha_2 S_2(\beta_{g1} + Z_g)(Y_f + (X_f - Y_f - Z_f)\alpha_1) = 0 \quad (10)$$

Where:

The terms of equations 9 & 10 have been described in Table 1, Table 2 and Table 3.

Therefore, an opaque group result can be detected by testing the validity of equations (9), (indep1 (8a) equal to 0) and (10), (indep2 (8b) plus indep3 (8c) equal to 0).

Note that these two equations do not use background opacity ($\alpha_0$) or background colour value ($S_0$), so can be calculated before the results of the group below have been determined. If the independent instructions (8a), (8d) and (8e), which comprise (9) and (10), are scheduled to execute first when processing a layer group, then once the opaqueness is evaluated, the results from the independent instructions can be used again as input into the dependent instruction (8f) and the remaining independent instructions (8b) and (8c) to produce the final result for the layer group without re-evaluating all the independent instructions.

The opaque group determination instructions are also performed per-pixel and as such well suited to implementation on a GPU.

A further advantage of this method is that if equations (9) and (10) are valid, and therefore the background layer does not contribute to the result, then the effect of the background layer is removed from equation (8) and the layer group result calculation can be simplified to the three-layer compositing equation (12) for fully opaque backgrounds:

$$\alpha_{012}S_{012} = \alpha_1 S_1 Z_f(Y_g - \alpha_2 Y_g \alpha_2 \beta_{g0}) + \alpha_2 S_2(\alpha_1 Z_f Z_g + \alpha_1 Z_f \beta_{g1} - Z_g) \quad (12)$$

Where:

The terms of equation 12 have been described in Table 1, Table 2 and Table 3.

Equation (12) has only two sub-terms namely indep4 (see 8d) and indep5 (see 8e) which have already been calculated in determining if the layer group is opaque or not, so the evaluation of the layer group result in equation (12) is trivial.

As previously noted, when the equations (9) and (10) are equal to zero this means that the group layer opacity is 100% and the background layer of the group has no contribution at all to the result. An alternate evaluation of group layer opacity is that instead of equations (9) and (10) being equivalent to 0, equations (9) and (10) need only be less than some pre-determined value such that the group layer opacity is some percentage substantially equivalent to being opaque, ie being greater than a pre-determined threshold, such that the background layer of the group has no visual contribution to the result.

Four Layer Porter and Duff Compositing

The method used to generalise the Porter and Duff compositing equations to three levels can also be used to generalise the equations to four levels.

Figure 9:
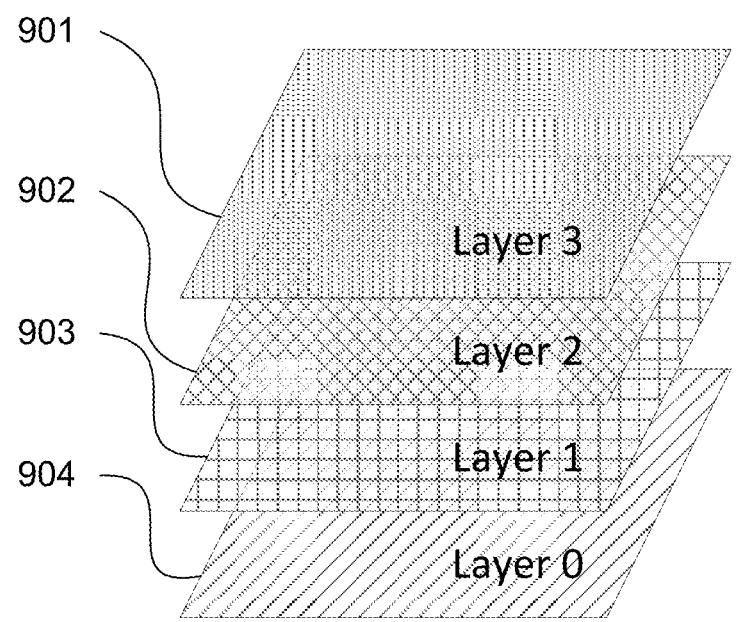
FIG. 9 depicts a four layer compositing group.

The case of four level compositing is shown in FIG. 9. There are four layers, a background layer 0 (ie 904), layer 1 (ie 903), layer 2 (ie 902) and an upper layer 3 (ie 901).

The four level Porter and Duff compositing equations consist of equation (12A) which calculates the alpha result for the four layers and equation (13) which calculates the pre-multiplied colour value for the four layers:

$$\alpha_{0123} = \alpha_0(Y_f + (X_f - Y_f - Z_f)\alpha_1) \quad (12A)$$
$$(Y_g + (X_g - Y_g - Z_g)\alpha_2)(Y_h + (X_h - Y_h - Z_h)\alpha_3) +$$
$$(Y_g + Z_f\alpha_1(X_g - Y_g - Z_g)\alpha_2)(Y_h + (X_h - Y_h - Z_h)\alpha_3) +$$
$$\alpha_2 Z_g(Y_h + (X_h - Y_h - Z_h)\alpha_3) + \alpha_3 Z_h$$

$$\alpha_{0123}S_{0123} = \alpha_0 S_0(Y_f - \alpha_1 Y_f + \alpha_1\beta_{f0}) \quad (13)$$
$$(Y_g - \alpha_2 Y_g + \alpha_2\beta_{g0})(Y_h - \alpha_3 Y_h + \alpha_3\beta_{h0}) +$$
$$\alpha_0\{\alpha_1 S_1(\beta_{f1} + Z_f)(Y_g - \alpha_2 Y_g + \alpha_2\beta_{g0})(Y_h - \alpha_3 Y_h + \alpha_3\beta_{h0}) +$$
$$\alpha_2 S_2(\beta_{g1} + Z_g)(Y_f - \alpha_1(X_f - Y_f - Z_f))$$
$$(Y_h - \alpha_3 Y_h + \alpha_3\beta_{h0}) + \alpha_3 S_3(\beta_{h1} + Z_h)$$
$$(Y_f - \alpha_1(X_f - Y_f - Z_f))(Y_g - \alpha_2(X_g - Y_g - Z_g))\} +$$
$$\{-\alpha_1 S_1 Z_f(Y_g - \alpha_2 Y_g + \alpha_2\beta_{g0})(Y_h - \alpha_3 Y_h + \alpha_3\beta_{h0}) +$$
$$\alpha_2 S_2(\alpha_1 Z_f Z_g + \alpha_1 Z_f \beta_{g1} - Z_g)(Y_h - \alpha_3 Y_h + \alpha_3\beta_{h0}) +$$
$$\alpha_3 S_3[Z_f\alpha_1(Y_g - \alpha_2(X_g - Y_g - Z_g)\alpha_2)(\beta_{h1} + Z_h) +$$
$$(\alpha_2 Z_h Z_g + \alpha_1 Z_g \beta_{h1} - Z_h)]\}$$

Where:

The majority of variables have already been described in previous equations and in Table 1, Table 2 and Table 3. The remaining variables are defined below:

$\alpha_3 S_3$ is the pre-multiplied colour of the layer 3 image pixel.

$\alpha_{0123}S_{0123}$ is the pre-multiplied colour result for the 4-layer Porter and Duff compositing equation.

$\beta_{h0}$ and $\beta_{h1}$ are the Porter and Duff blend mode function control coefficients which describe how the result from the bottom three layers (layer 0/1/2) and the top layer (layer 3), of the group, contribute to the group colour result.

$\beta_{g0}$ is the control coefficient (either 0 or 1) which controls whether or not the layer 0/1/2 result contributes to the layer group result; and $\beta_{g1}$ is the control coefficient (either 0 or 1) which controls whether or not $S_2$ (layer 3/destination colour) contributes to the result.

In a similar way as was done for the two level compositing equations, the Porter and Duff compositing operators specified in the input PDL script are used to set the values for the coefficients defined in Table 2.

In a similar manner to the three-layer Porter and Duff compositing equation, the four-layer equation (13) above can be deconstructed into instructions independent of the layer group background layer and instructions dependent of the layer group background layer. Further there are a number of sub-expressions in the equation (13) which are common to more than one sub-expression and need only be computed once.

Scheduling of the instructions for the four-layer case is similar to that for the three-layer case as illustrated FIG. 14 and explained above except that more instructions will be scheduled for each layer group. The principle is the same as for the three layer case however.

Blend Equations

The three-layer Porter and Duff compositing equations (3, 4) do not support the application of the multiply and screen blend modes of Porter and Duff. The three-layer equations (3, 4) can be extended to use the multiply and screen blend modes of Porter and Duff by adding a blend term γ to the compositing functions (6, 7) to give the extended blend mode functions (14, 15) as follows:

$$f(S_0, S_1) = \beta_{f0} S_0 + \beta_{f1} S_1 + \gamma_f S_0 S_1 \quad (14)$$

$$g(S_1, S_2) = \beta_{g0} S_1 + \beta_{g1} S_2 + \gamma_g S_2 S_1 \quad (15)$$

Where:
$\gamma_f$ is the blend mode coefficient used for layer 0 and layer 1;
$\gamma_g$ is the blend mode coefficient used for the layer 0/1 result and layer 2; and
The remaining terms are described in Table 1, Table 2 and Table 3.

By substitution of equations (14) and (15) into equation (8), the three-layer extended blend mode compositing equation (16) is:

$$\alpha_{012} S_{012} = \quad (16)$$
$$\alpha_0 S_0 \{Y_g - Y_g \alpha_2 + \beta_{g0} \alpha_2 + \gamma_g \alpha_2 S_2\}\{Y_f - Y_f \alpha_1 + \alpha_1 \beta_{f0} + \gamma_f \alpha_1 S_1\} +$$
$$\alpha_0 \{\{Y_g - Y_g \alpha_2 + \beta_{g0} \alpha_2 + \gamma_g \alpha_2 S_2\}(Z_f + \beta_{f1}) \alpha_1 S_1 +$$
$$(Y_f + (X_f - Y_f - Z_f) \alpha_1)(\beta_{g1} + Z_g) \alpha_2 S_2\} +$$
$$Z_f \alpha_1 S_1 \{Y_g - Y_g \alpha_2 + \beta_{g0} \alpha_2 + \gamma_g \alpha_2 S_2\} +$$
$$\alpha_2 S_2 (\alpha_1 Z_f Z_g + \alpha_1 Z_f \beta_{g1} - Z_g)$$

Where:
$\gamma_f$ is the blend mode coefficient used for layer 0 and layer 1;
$\gamma_g$ is the blend mode coefficient used for the layer 0/1 result and layer 2; and
The remaining terms are described in Table 1, Table 2 and Table 3.

In a similar way to the compositing formulae, the values of the X, Y, Z, $\beta_{f0}$, $\beta_{f1}$ and $\gamma_{f1}$ terms are all determined by the blend operator set in the input PDL script. Table 2 describes the relationship between the blend operator and the values of these terms for the case of Porter and Duff blending.

The values for the blend mode control coefficients for the extended blend modes multiply and screen are shown in Table 4. The X column also applies to the multi-layer coefficients $X_f$, $X_g$, $X_h$. The Y column also applies to the multi-layer coefficients $Y_f$, $Y_g$, $Y_h$. The Z column also applies to the corresponding multi-layer coefficients $Z_f$, $Z_g$, $Z_h$. The $\beta_{f0}$ column also applies to the multi-layer compositing coefficient $\beta_{g0}$ and $\beta_{h0}$. The $\beta_{f1}$ column also applies to the multi-layer compositing coefficient $\beta_{g1}$ and $\beta_{h1}$. The $\gamma_f$ column also applies to the multi-layer compositing coefficient $\gamma_g$.

TABLE 4

Porter and Duff compositing operators for blend modes.

| P&D Operator | X | Y | Z | $B_{f0}$ | $\beta_{f1}$ | $\gamma_f$ | Description |
|---|---|---|---|---|---|---|---|
| multiply | 1 | 0 | 1 | 0 | 0 | 1 | Multiply blend mode. |
| screen | 1 | 0 | 1 | 1 | 1 | 0 | Screen blend mode. |

First Arrangement

This first arrangement assumes that the compositing algorithm is provided data in a format that describes the objects that contribute to every point, such as a fillmap.

Print rendering systems are normally provided with a source document in a page description language, such as Portable Document Format (PDF) developed by Adobe Systems Inc. Such print rendering systems generate pixel data output that is suitable for sending the pixel data to printer hardware for drawing on an output medium.

A print rendering system may for example take drawing requests or instructions from the PDL and render the drawing instructions directly into a full-page frame-buffer. The drawing instructions can be rendered by converting the drawing instructions to one or more intermediate formats. The present arrangement relates to printing systems that use an intermediate format which provides a z-stack of objects contributing to each pixel, for example a fillmap data structure, or simply a fillmap.

Figure 16:
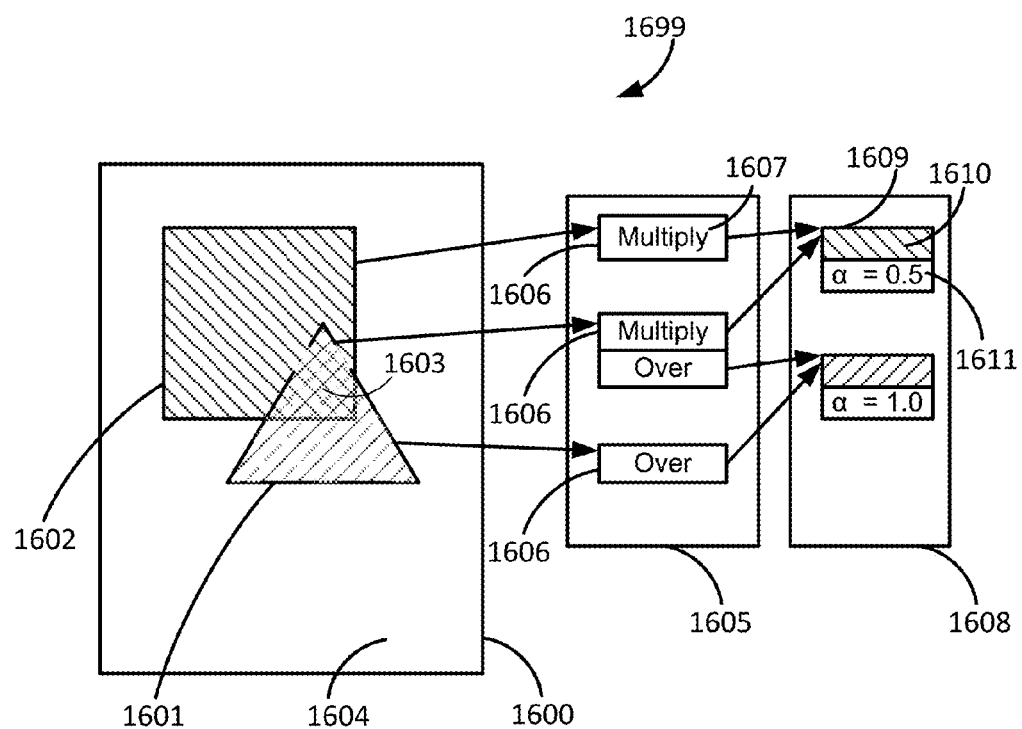
FIG. 16 is a depiction illustrating at least one embodiment of a data structure of a fillmap.

A fillmap describes the content of a single page in a print document. The data structure of a fillmap 1699 is shown in FIG. 16. In the fillmap 1699, the content of a page 1600 to be reproduced by printing is divided into non-overlapping regions 1601, 1602, 1603, including background regions 1604. Each region of a fillmap is an area containing a particular combination of contributing PDL objects. The extent of each region is described by edges that are aligned with a pixel grid able to be printed by a print engine. The content of each region 1601, 1602 and 1603 is defined by a set of compositing stacks 1605. Each compositing stack is an ordered list of level appearances 1606, each of which corresponds to an object that contributes to the appearance of the corresponding region. Each level appearance 1606 references either a single fill or a group of fills in a fill store 1608, generally formed within the memory 1506. The level appearance 1606 also defines one or more compositing operations 1607 that are used to draw the group or object on the underlying objects. In the example of FIG. 16, the compositing operations Multiply and Over are used by the three level appearances 1606. A fill 1609 describes the colour 1610 and alpha 1611 for the pixels of the corresponding non-overlapping region. The collection of fills 1608 describes the regions on the page 1600. The collection of fills 1608, the compositing stacks 1605 and the regions 1601, 1602 and 1603 form the fillmap 1699 for the page 1600. Fills include flat regions of colour, linear and radial gradients and images. For example, the fill 1609 may consist of a red colour and a level appearance 1606 could composite the red fill on an underlying object using the "Multiply" blend mode, so that the compositing stack 1605 would comprise the red level appearance along with the level appearances of the underlying objects.

In the example of FIG. 16, there is no level appearance illustrated for the background region 1604. The region 1604 can be assumed to be the implicit destination of the lowest compositing operation in each stack 1605. In other implementations, an explicit entry representing the background region 1604 may be inserted in the compositing stack 1605. As shown in FIG. 16, the structure of the fillmap 1699 may be considered an intermediate format which uses non-overlapping regions that reference compositing stacks that in turn reference fills for a page where, edges associated with objects are pixel-aligned.

The first CILP arrangement that determines the colour values of a composited pixel is now described. The input fillmap 1699 comprises a plurality of compositing stacks such as 1605, in which all objects contributing to a particular pixel are z-ordered. Each entry in the compositing stack 1605 references object information, such as fills 1609 stored in the fill store 1608.

FIG. 3 describes how one CILP arrangement functions. In a first step 301 (all method steps in this process are performed by one or more of the processors $1505^{(1)}$-$1505^{(n)}$ as directed by the software 1533 and/or the scheduler 1533') a z-ordered list of layers (a compositing stack) to be composited is obtained. This list is constructed from the z-ordered list of objects which contribute to the current pixel. The first (and lowest) layer is the page background. The layers above that correspond to the z-ordered objects that contribute to the pixel.

The process then moves to a step 302 where the number of layers, m, in the list of layers obtained in step 303 is determined.

The process then moves to a step 303 where the list of layers obtained in the step 301 is divided into groups of at most three layers. The first group is composed of the lowest layers in the layer list (the page background, and the first two objects in the z-ordered object list). In all other groups, the first layer (ie the lowest layer) in the group is the computed result of the group below the group in question, and the second and third layers are the next two layers from the layer list. Note that the top-most group may have only two layers.

The process then moves to a step 304, described hereinafter in more detail with reference to FIGS. 4 and 5, where the first compositing pass is performed. In this step, the compositing terms which do not involve the background layer, as exemplified by the equations (8a), (8b), (8c), (8d), (8e) for example, are computed (see 505 in FIG. 5) for every layer group. These layer group calculations are done in parallel since the compositing terms independent of the background layer for the group can be computed without the result from layers group below it. Groups are processed in order from the top-most group to the bottom-most group or in the case of a multi-processor implementation, the groups can be scheduled to run on multiple processors in parallel starting with scheduling of the top most group. If a fully-opaque group is detected (see 506 in FIG. 5), then groups below that group are marked (see 507 in FIG. 5) as irrelevant, and all processing on them is stopped (see 508 in FIG. 5).

The process then moves to step a 305, described hereinafter in more detail with reference to FIG. 7. In this step, the second and final compositing pass is performed. For each group, the compositing calculations are completed, using the result from the group below as the background layer. Calculations associated with data from a background layer are done in order from the bottom-most group to the top-most group, i.e. the groups are processed in series.

Once the final (top-most) group is processed, then the pixel value has been determined, and the process is complete.

FIG. 4 details the process performed by the step 304 in FIG. 3 which determines the non-background compositing terms for all groups.

The process starts at a step 401 (all method steps in this process are performed by one or more of the processors $1505^{(1)}$-$1505^{(n)}$ as directed by the software 1533 and/or the scheduler 1533'). In this step, all groups are put in a waiting list in reverse z-order, where the lowest group (which contains the page background) at the tail of the list, and the highest group at the head of the list. All groups are marked as relevant.

The process then moves to a step 402. In this step a number of group compositing threads are started, using one or more of the processors $1505^{(1)}$-$1505^{(n)}$ as directed by the software 1533 and the scheduler 1533'. Typically, the number of group compositing threads started is equal to the number of processor cores available. See the description of step 403 below for a description of one of the group compositing threads.

The process then moves to a step 404 where the process waits for all of the group compositing threads started in step 402 to finish. The process then completes.

The steps 403, described hereinafter in more detail with reference to FIG. 5, selects relevant groups from the waiting list and determines terms not requiring background layer in worker thread (ie in each group compositing thread). In this step, groups in the waiting list are processed to calculate the compositing terms which don't include the background layer.

Figure 5:
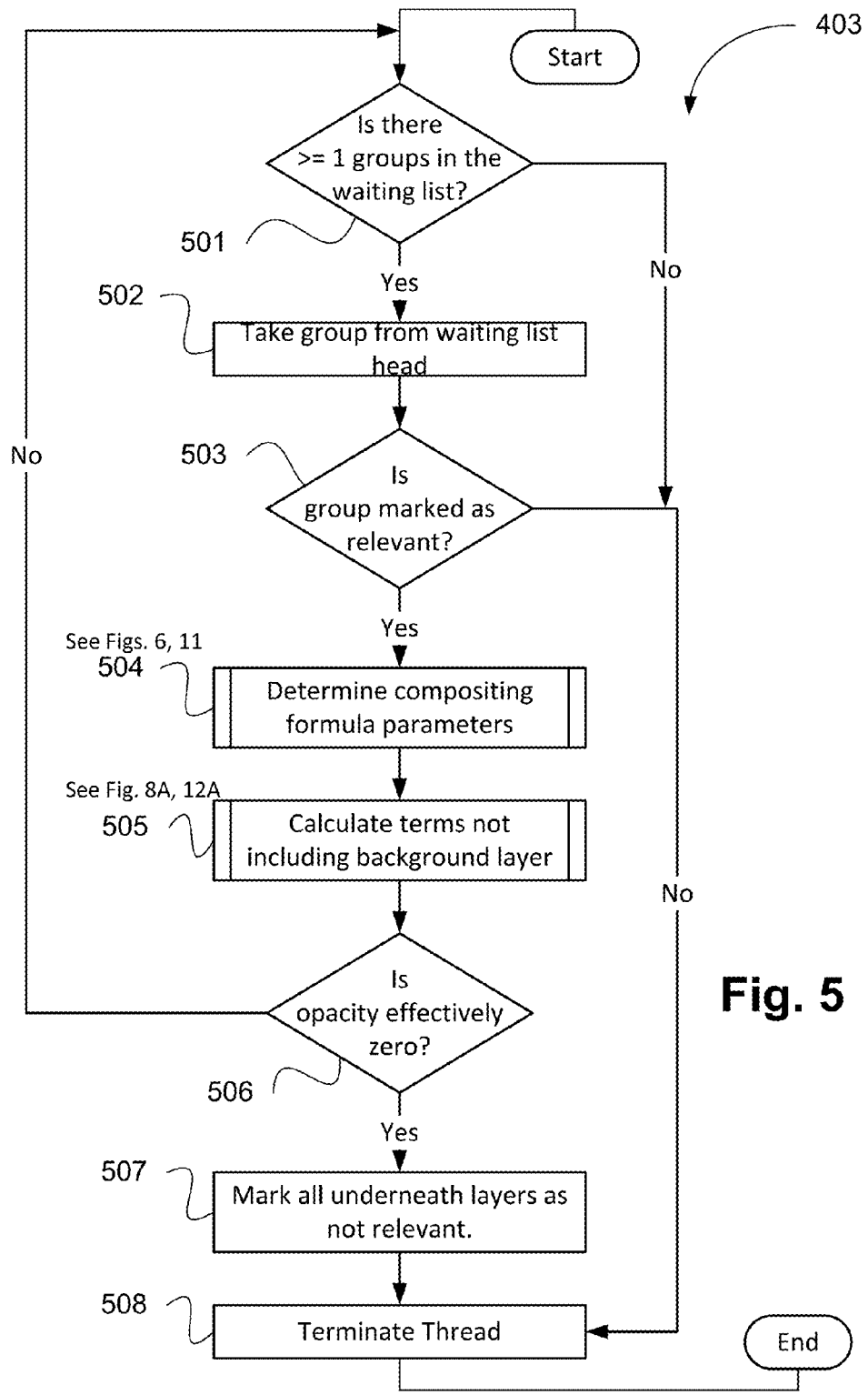
FIG. 5 is a flow diagram illustrating the process of calculating non-background terms for groups in the waiting list.

FIG. 5 details the process performed by each of the group compositing threads spawned in the step 402.

The process starts at a decision point 501 (all method steps in this process are performed by one or more of the processors $1505^{(1)}$-$1505^{(n)}$ as directed by the software 1533 and/or the scheduler 1533'). In this decision point, the process checks to see if there is at least one group in the waiting list. If the waiting list is empty, then the process moves to a step 508 which terminates the thread. If there is at least one group in the waiting list, then the process moves to a step 502.

In the step 502, the current thread removes the group at the head of the waiting list. This becomes the current group that this thread will work on. Note that since there are multiple threads, concurrent programming techniques must be used to ensure that the waiting list is accessed correctly in both the decision point 501 and the step 502.

In the decision point 503, the current group is examined to see if it is marked as relevant. If the group is marked as relevant, then the process moves to a step 504. If the group is not marked as relevant, then the process moves to the step 508.

In the step 504, described hereinafter in more detail with reference to FIGS. 6 and 11, the 3-level Porter and Duff compositing formula parameters that will be used to calculate the group compositing results are determined.

The process then moves to a step 505, described hereinafter in more detail with reference to FIG. 8A. In this step, the terms of the compositing formula (that were determined in the step 504), that do not include the group background layer are calculated.

The process then moves to a decision point 506. In this decision point, the calculated results of the step 505 are examined to see if the result of the layer is opaque, using the equations (9) and (10). If the result of the layer is opaque, then the process moves to a step 507. If the layer is not opaque, then the processing loops back to the decision point 501 to get the next relevant group.

In the step 507, all layers below the current layer are marked as not relevant.

The process then moves to the step 508. In this step, the group compositing thread is terminated. This completes the processing of the thread.

Figure 6:
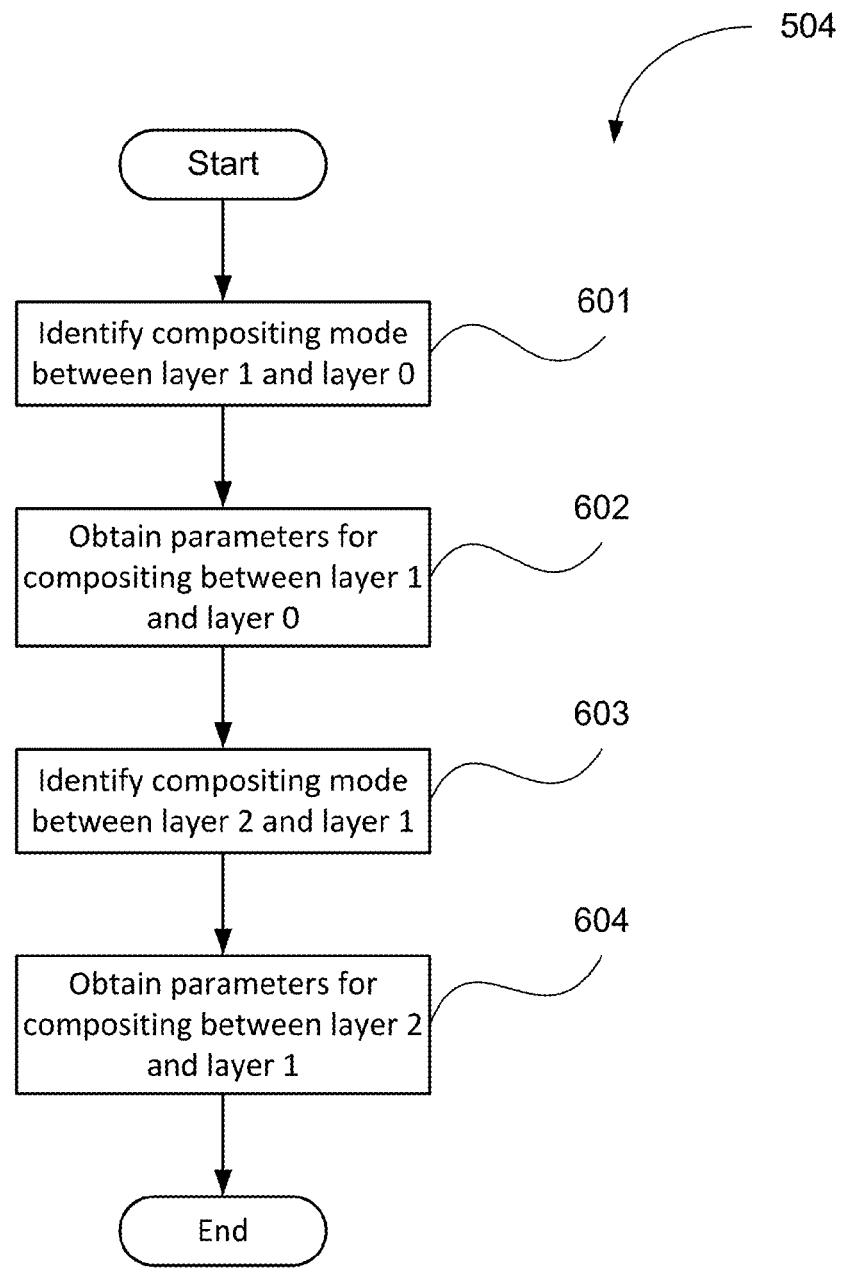
FIG. 6 is a flow diagram illustrating the process of determining the compositing formula parameters for the three layer group case.

FIG. 6 details the process used to determine the compositing formula performed in the step 504 in FIG. 5 (all method steps in this process are performed by one or more of the processors $1505^{(1)}$-$1505^{(n)}$ as directed by the software 1533 and/or the scheduler 1533').

The compositing formula parameters are obtained for a group, using the Porter and Duff operator for each pair of layers as specified by the original PDL input.

The process starts at a step 601. In this step, the Porter and Duff operator between layer 1 (ie 202 in FIG. 2A) and the layer 0 (ie 203 in FIG. 2A) is identified.

The process then moves to a step 602. In this step, the parameters $X_f$, $Y_f$, $Z_f$, $\beta_{f0}$ and $\beta_{f1}$ for the compositing between layers 1 and 0 are obtained. These parameters are obtained by using the Porter and Duff operator obtained in step the 601 to find the matching row in Table 3 and reading out the parameters from that row.

The process then moves to a step 603. In this step, the Porter and Duff operator between layer 2 (ie 201) and layer 1 (ie 202) is identified.

The process then moves to step a 604. In this step, the parameters $X_g$, $Y_g$, $Z_g$, $\beta_{g0}$ and $\beta_{g1}$ for the compositing between layers 2 and 1 are obtained. Again, these parameters are obtained by using the Porter and Duff operator obtained in the step 603 to find the matching row in table 1 and reading out the parameters from that row.

This completes the processing of FIG. 6.

Figure 7:
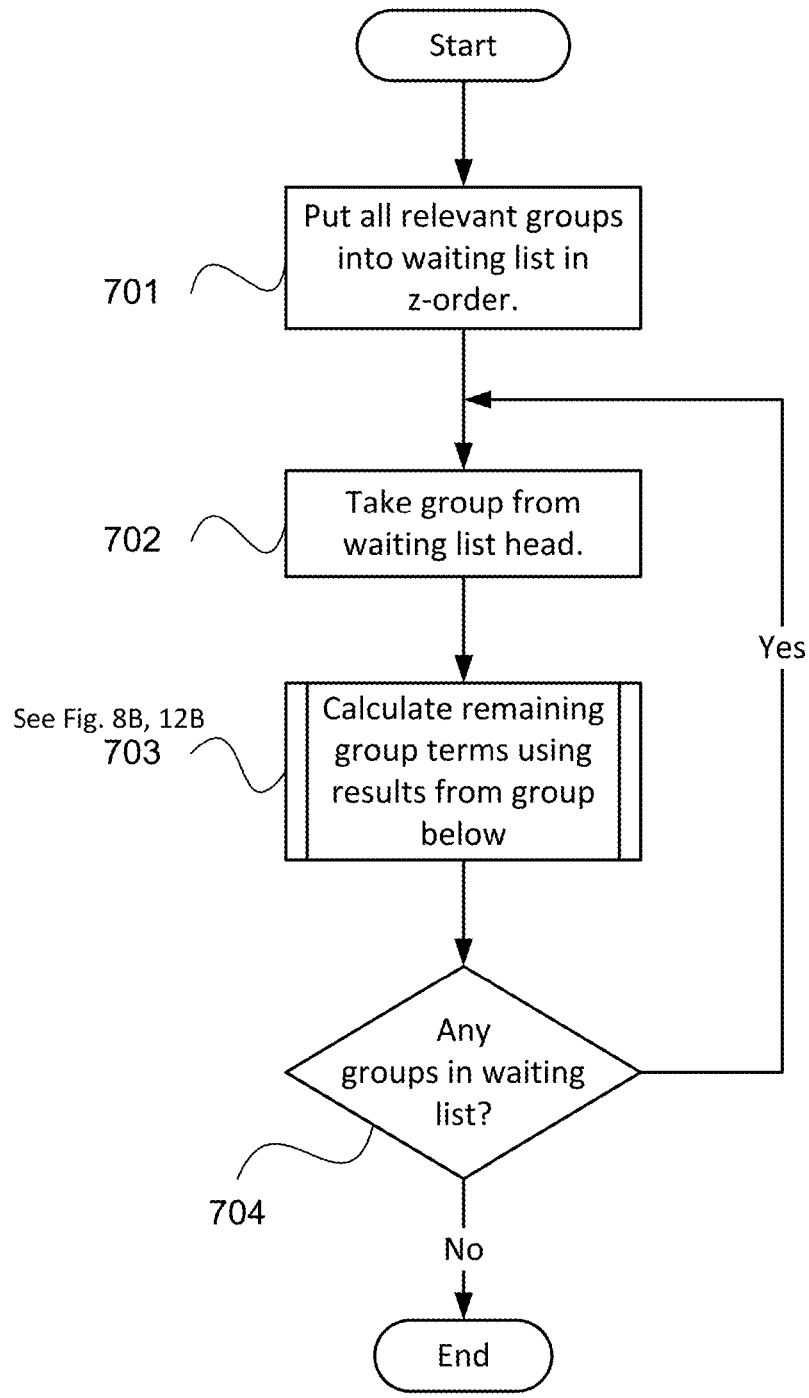
FIG. 7 is a flow diagram illustrating the second pass processing.

FIG. 7 details the process of computing the full compositing results for all groups in z-order performed by the step 305 in FIG. 3. All method steps in this process are performed by one or more of the processors $1505^{(1)}$-$1505^{(n)}$ as directed by the software 1533 and/or the scheduler 1533'.

The process starts at a step 701. In this step, the waiting list is cleared. Then all groups that are currently marked as relevant are put into the waiting list. The waiting list is ordered so that the bottom-most (in z-order) group (which contains the page background) is at the head of the waiting list, while the top most-group is at the tail of the list.

The process then moves to a step 702. In this step, the group at the head of the waiting list is selected and removed from the list.

The process then moves to a step 703, described hereinafter in more detail with reference to FIG. 8B.

The process then moves to a decision point 704. If there are groups remaining in the waiting list, then the process loops back to step 702. If there are no groups left in the waiting list, then the process described by FIG. 7 is completed.

Figure 8A:
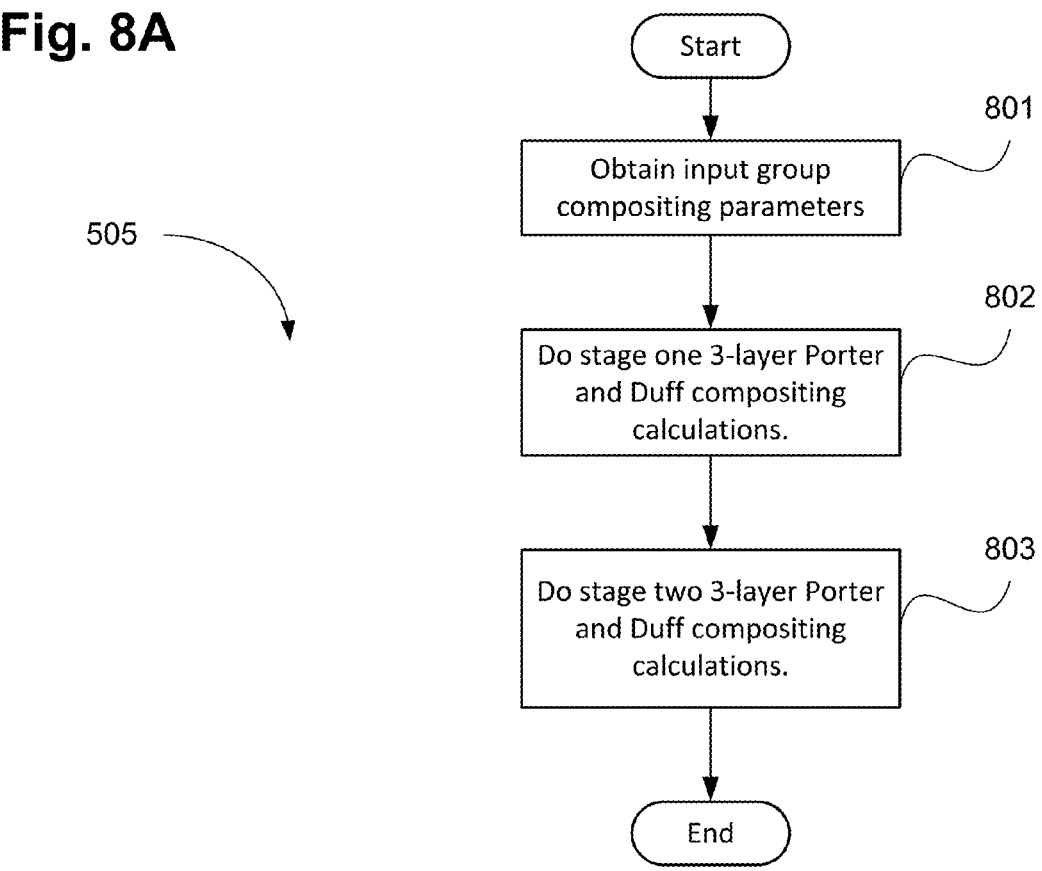
FIG. 8A is a flow diagram illustrating the process of computing the non-background terms for the three layer group case.

FIG. 8A details the process of computing, for a group, the 3-layer Porter and Duff terms that do not involve the background layer of the group. All method steps in this process are performed by one or more of the processors $1505^{(1)}$-$1505^{(n)}$ as directed by the software 1533 and/or the scheduler 1533'.

The process starts at a step 801. In this step, the currently available input parameters are obtained. These input parameters are: $\alpha_1 S_1$, $\alpha_1$, $\alpha_2 S_2$, $\alpha_2$, $X_f$ $X_g$, $Y_f$ $Y_g$, $Z_f$ $Z_g$, $\beta_{f0}$, $\beta_{f1}$, $\beta_{g0}$ and $\beta_{g1}$. Note that $\alpha_0 S_0$, $\alpha_0$ are not available at this point.

The input parameters are described in Table 1 and Table 2.

The process then moves to a step 802. In this step, stage one calculations (equations 9 & 10) are performed for the group. The calculations are defined by the following:

$$I20=Y_f-Y_f\alpha_1+\alpha_1\beta_{f0} \quad (20)$$

$$I21=Y_g-Y_g\alpha_2\alpha_2\beta_{g0} \quad (21)$$

$$I22=\alpha_1 Z_f Z_g+\alpha_1 Z_f\beta_{g1}-Z_g \quad (22)$$

$$I23=(\beta_{g1}+Z_g)(Y_f+(X_f-Y_f-Z_f)\alpha_1) \quad (23)$$

Equations 20-23 are partial sub-expressions of equation 8 which can be calculated independently of each other. The results of the sub-expressions 20-23 are represented by the terms I20-I23 respectively. The terms in the sub-expressions 20-23 have been described previously in Table 1, Table 2 and Table 3.

The process then moves to a step 803. In this step, the stage two calculations are performed for the group. The calculations use the results of the numbered calculations from the step 802. The calculations are defined by the following:

$$I25=I20\times I21 \quad (25)$$

$$I26=\alpha_2 S_2\times I23 \quad (26)$$

$$I27=\alpha_2 S_2\times I22 \quad (27)$$

$$I28=\alpha_1 S1\times I21 \quad (28)$$

Equations 25-28 are partial sub-expressions of equation 8 which have further been simplified by representing the sub-expressions of equation 8 in terms of the results I20-I23 of the partial sub-expressions 20-23. The partial sub-expressions 25-28 can be calculated independently of each other. The results of the sub-expressions 25-28 are represented by the terms I25-I28 respectively. The terms in the sub-expressions 25-28 have been described previously in Table 1, Table 2 and Table 3.

Once the step 803 is completed, the process for FIG. 8A is complete.

Figure 8B:
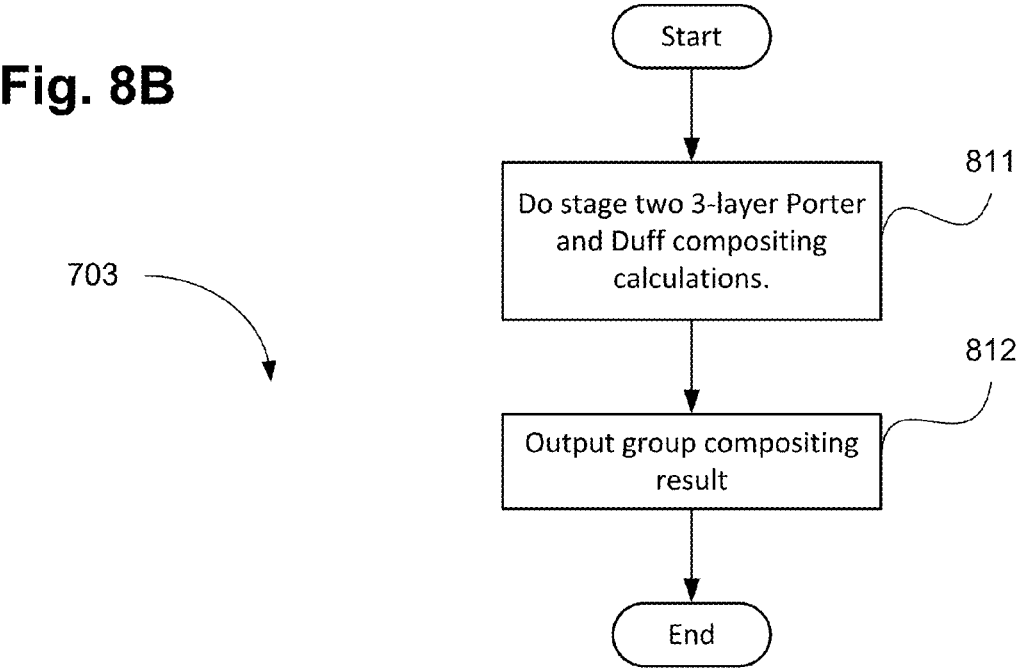
FIG. 8B is a flow diagram illustrating the process of completing the calculation of the group results for the three layer group case.

FIG. 8B details the process of completing, for a group, the 3-layer Porter and Duff compositing calculations, as performed by the step 703 in FIG. 7. All method steps in this process are performed by one or more of the processors $1505^{(1)}$-$1505^{(n)}$ as directed by the software 1533 and/or the scheduler 1533'.

When the process 703 in FIG. 8B is performed, the results from the layer below, $\alpha_0 S_0$, $\alpha_0$, are already available.

The process starts at a step 811. In this step, the stage three calculations are performed for the group. The calculations are defined as follows:

$$\alpha_0 S_0\times I25+\alpha_0(I28(\beta_{f1}+Z_f)+I26)+I27-Z_f\times I28 \quad (29)$$

Equation 29 is an alternate form of the compositing equation 8 illustrating how the compositing equation 8 can be resolved from the results of the independent sub-expressions 20-23 and 25-28. The terms in equation 29 have been described previously in Table 1, Table 2 and Table 3.

The process then moves to a step 812. In this step, the computed group compositing result is outputted. The process described by FIG. 8B is then complete.

Second Arrangement

This second CILP arrangement is a variation of the first arrangement in which the 4-layer Porter and Duff equations are used instead of the 3-layer equations. This process is very similar to the process of arrangement 1. Only the differences will be described.

The second arrangement of the process that determines the colour values of a composited pixel using the four layer Porter and Duff compositing equations is now described.

Figure 10:
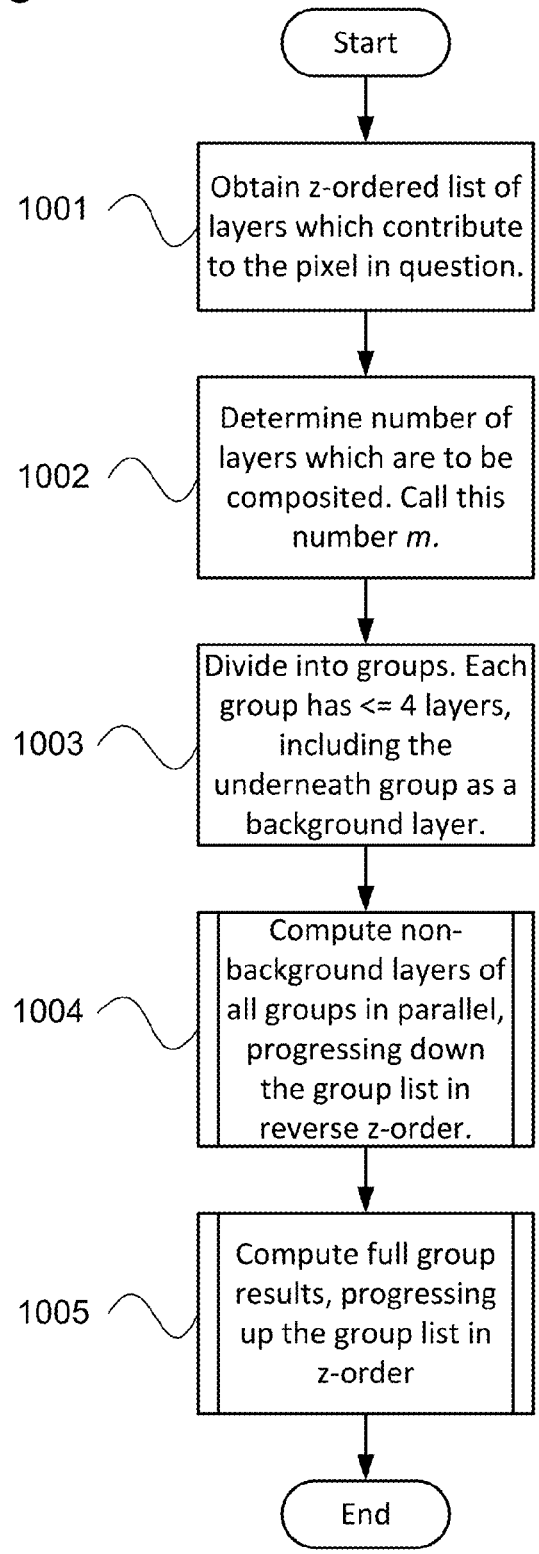
FIG. 10 is a flow diagram illustrating a method for parallelising per-pixel compositing, according to a second CILP arrangement.

FIG. 10 described how this arrangement functions. All method steps in this process are performed by one or more of the processors $1505^{(1)}$-$1505^{(n)}$ as directed by the software 1533 and/or the scheduler 1533'.

The process in FIG. 10 is very similar to the process depicted in FIG. 3.

Steps 1001 and 1002 are identical to the equivalent steps 301 and 302 in FIG. 3.

In a subsequent step 1003, the list of layers obtained in the step 1001 is divided into groups of at most four layers. Note that the top-most group may have fewer than four layers.

Steps 1004 (described in more detail with reference to FIG. 4) and 1005 are identical to the equivalent steps 304, 305 in FIG. 3.

The process described in FIG. 5, which details the process performed by each of the group compositing threads spawned in step 402, is identical for this arrangement, except that the details of step 504 is described in more detail with reference to FIG. 11 and the details of the step 505 are described in more detail with reference to FIG. 12A.

Figure 12A:
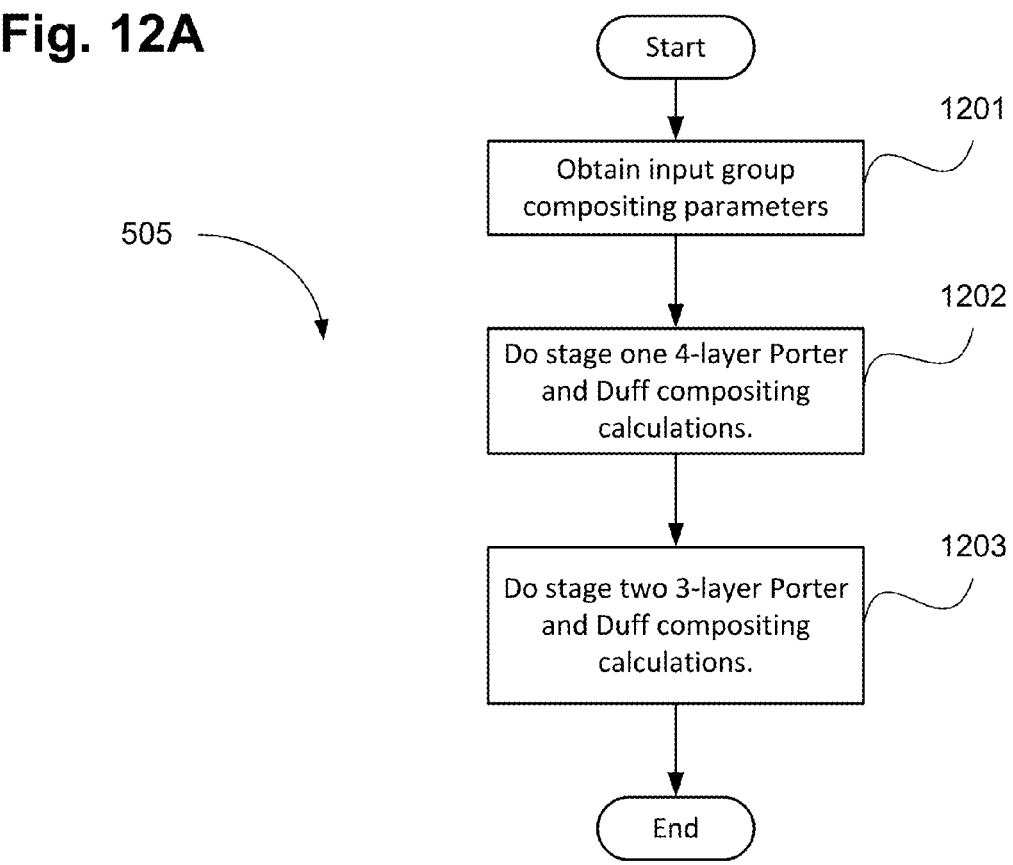
FIG. 12A is a flow diagram illustrating the process of computing the non-background terms for the four layer group case.
Figure 12B:
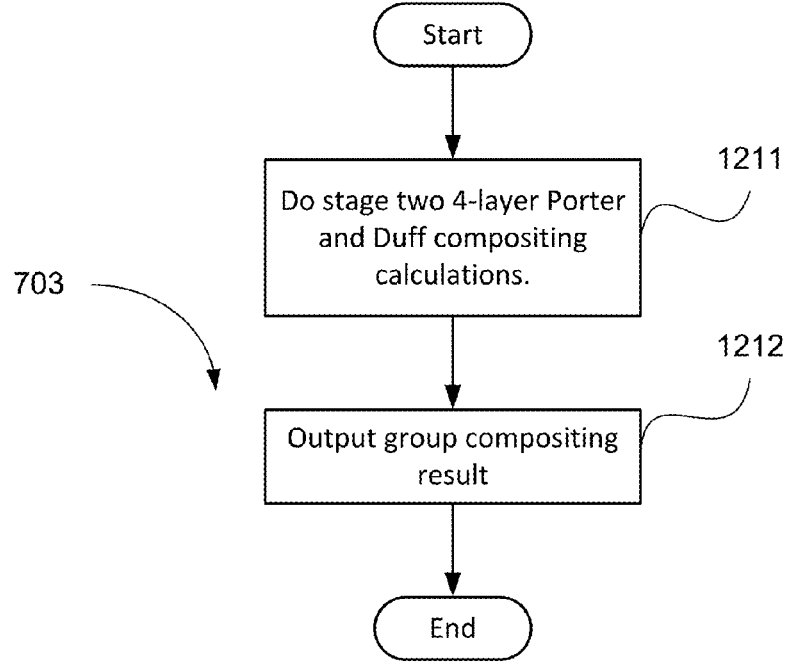
FIG. 12B is a flow diagram illustrating the process of completing the calculation of the group results for the four layer group case.

The process described in FIG. 7, which details the process of computing the full compositing results for all groups in z-order, is identical for this arrangement, except that the details of step 703 is described in FIG. 12B.

Figure 11:
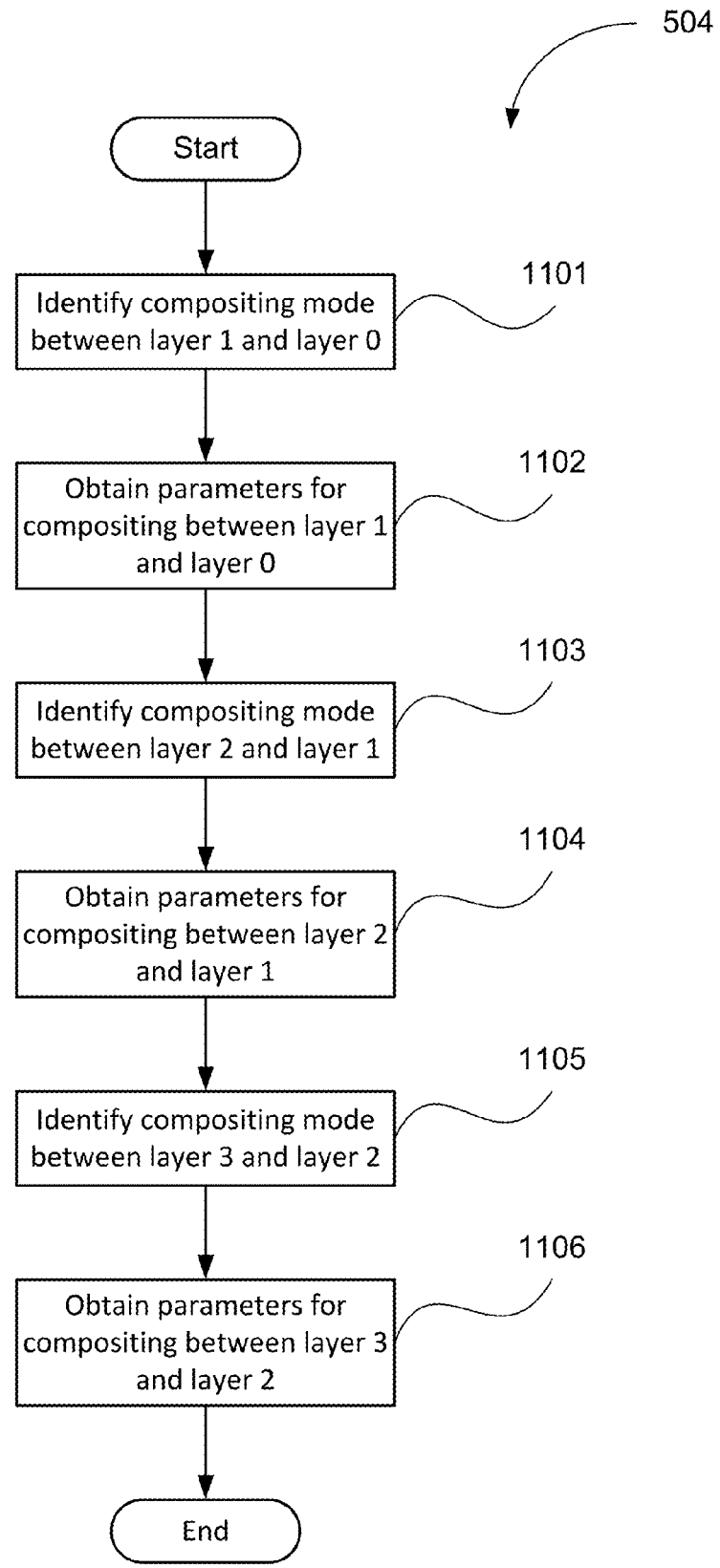
FIG. 11 is a flow diagram illustrating the process of determining the compositing formula parameters for the 4-layer group case.

FIG. 11 details the process of determining the compositing formula for 4-layer Porter and Duff compositing, as performed by the step 504. All method steps in this process are performed by one or more of the processors 1505$^{(1)}$-1505$^{(n)}$ as directed by the software 1533 and/or the scheduler 1533'.

The compositing formula parameters are obtained for a group, using the Porter and Duff operator for each layer as specified by the original PDL input.

The process starts at a step 1101. In this step, the Porter and Duff operator between layer 1 (ie 903 in FIG. 9) and the layer 0 (ie 904 in FIG. 9) is identified.

The process then moves to a step 1102. In this step, the parameters $X_f$, $Y_f$, $Z_f$, $\beta_{f0}$ and $\beta_{f1}$ for the compositing between layers 1 and 0 are obtained. These parameters are obtained by using the Porter and Duff operator obtained in the step 1101 to find the matching row in table 1 and reading out the parameters from that row.

The process then moves to a step 1103. In this step, the Porter and Duff operator between layer 2 (ie 902) and layer 1 (ie 903) is identified.

The process then moves to a step 1104. In this step, the parameters $X_g$, $Y_g$, $Z_g$, $\beta_{g0}$ and $\beta_{g1}$ for the compositing between layers 2 and 1 are obtained. Again, these parameters are obtained by using the Porter and Duff operator obtained in the step 1103 to find the matching row in table 1 and reading out the parameters from that row.

The process then moves to a step 1105. In this step, the Porter and Duff operator between layer 3 (ie 901) and layer 2 (ie 902) is identified.

The process then moves to a step 1106. In this step, the parameters $X_g$, $Y_g$, $Z_g$, $\beta_{g0}$ and $\beta_{g1}$ for the compositing between layers 3 and 2 are obtained. Again, these parameters are obtained by using the Porter and Duff operator obtained in the step 1103 to find the matching row in table 1 and reading out the parameters from that row.

This completes the process depicted by FIG. 11.

FIG. 12A details the process of computing, for a group, the 4-layer Porter and Duff terms that do not involve the background layer of the group, as performed by the step 505 in FIG. 5. All method steps in this process are performed by one or more of the processors 1505$^{(1)}$-1505$^{(n)}$ as directed by the software 1533 and/or the scheduler 1533'.

The process starts at a step 1201. In this step, the currently available input parameters are obtained. These input parameters are: $\alpha_1 S_1$, $\alpha_1$, $\alpha_2 S_2$, $\alpha_2$, $\alpha_3 S_3$, $\alpha_3$, $X_f$, $X_g$, $X_h$, $Y_f$, $Y_g$, $Y_h$, $Z_f$, $Z_g$, $Z_h$, $\beta_{f0}$, $\beta_{f1}$, $\beta_{g0}$, $\beta_{g1}$, $\beta_{h0}$ and $\beta_{h1}$. Note that $\alpha_0 S_0$, $\alpha_0$ are not available at this point.

The process then moves to a step 1202. In this step, stage one calculations are performed for the group. The calculations are defined as follows:

$$I30 = Y_f - \alpha_1 Y_f + \alpha_1 \beta_{f0} \tag{30}$$

$$I31 = Y_g - \alpha 2 Y_g + \alpha_2 \beta_{g0} \tag{31}$$

$$I32 = Y_h - \alpha_3 Y_h + \alpha_3 \beta_{h0} \tag{32}$$

$$I33 = \alpha_1 S_1 (\beta_{f1} - Z_f) \tag{33}$$

$$I34 = \alpha_2 S_2 (\beta_{g1} - Z_g) \tag{34}$$

$$I35 = \alpha_3 S_3 (\beta_{h1} - Z_h) \tag{35}$$

$$I36 = (Y_f - \alpha_1 (X_f - Y_f - Z_f)) \tag{36}$$

$$I37 = (Y_g - \alpha_2 (X_g - Y_g - Z_g)) \tag{37}$$

$$I38 = \alpha_1 Z_f Z_g + \alpha_1 Z_f \beta_{g1} - Z_g \tag{38}$$

$$I39 = \alpha_2 Z_h Z_g + \alpha_1 Z_g \beta_{h1} - Z_h \tag{39}$$

$$I40 = -\alpha_1 S_1 Z_f \tag{40}$$

Equations 30-40 are partial sub-expressions of equation 13 which can be calculated independently of each other. The results of the sub-expressions 30-40 are represented by the terms 130-140 respectively. The terms in the sub-expressions 30-40 have been described previously in Table 1, Table 2 and Table 3.

The process then moves to a step 1203. In this step, the stage two calculations are performed for the group. The calculations use the results of the numbered calculations from the step 1202. The calculations are as follows:

$$I41 = I30 \times I31 \times I32 \tag{41}$$

$$I42 = I31 \times I32 \times I33 \tag{42}$$

$$I43 = I32 \times I34 \times I36 \tag{43}$$

$$I44 = I35 \times I36 \times I37 \tag{44}$$

$$145 = I31 \times I32 \times I40 \tag{45}$$

$$I46 = \alpha_2 S_2 \times 132 \times 138 \tag{46}$$

$$I47 = \alpha_1 Z_f \times I35 \times I37 \tag{47}$$

Equations 41-47 are partial sub-expressions of equation 13 which have further been simplified by representing the sub-expressions of equation 13 in terms of the results 130-140 of the partial sub-expressions 30-40. The partial sub-expressions 41-47 can be calculated independently of each other. The results of the sub-expressions 41-47 are represented by the terms 141-147 respectively. The terms in the sub-expressions 41-47 have been described previously in Table 1, Table 2 and Table 3.

Note that there are some common terms in the above equations. Intermediate calculations can be used to optimise these calculations.

Once the step 1203 is done, the process described by FIG. 12A is complete.

FIG. 12B details the process of completing, for a group, the 4-layer Porter and Duff compositing calculations as performed by the step 703 in FIG. 7. When the process in FIG. 12B commences, the results from the layer below, $\alpha_0 S_0$, $\alpha_0$, are available.

The process starts at a step 1211. In this step, the stage three calculations are performed for the group. The calculations are as follows:

$$\alpha_0 S_0 \times I41 + \alpha_0 (I42 + I43 + I44) + (I45 + I46 + I47 + I39) \tag{50}$$

Equation 50 is an alternate form of the compositing equation 13 illustrating how the compositing equation 13 can be resolved from the results of the independent sub-expressions 30-47. The terms in equation 50 have been described previously in Table 1, Table 2 and Table 3.

The process then moves to a step 1212. In this step, the computed group compositing result is outputted. The processing of FIG. 12B is then complete.

Third Arrangement

This $3^{rd}$ CILP arrangement is a variation of the first arrangement where the 3-layer Porter and Duff blend extension equations are used instead of the 3-layer equations. This process is very similar to the process of the first CILP arrangement. Only the differences will be described.

The third CILP arrangement of the process that determines the colour values of a composited pixel using the three layer Porter and Duff blend equations is now described.

The process described in FIG. 3, which details the overall compositing process, is identical for this arrangement.

The process described in FIG. 4, which details the process of computing the non-background compositing terms for all groups, is identical for this arrangement.

The process described in FIG. 5, which details the process performed by each of the group compositing threads spawned in the step 402, is identical for this arrangement.

The process described in FIG. 6, which details the process of determining compositing formula parameters, is identical for the $3^{rd}$ CILP arrangement, except for the details of the steps 602 and 604.

In the $3^{rd}$ CILP arrangement, the step 602 is performed as follows: In this step, the parameters $X_f$, $Y_f$, $Z_f$, $\beta_{f0}$, $\beta_{f1}$ and $\gamma_f$ for the compositing between layers 1 and 0 are obtained. These parameters are obtained by using the Porter and Duff operator obtained in the step 601 to find the matching row in Table 4 and reading out the parameters from that row.

In this CILP arrangement, the step 604 is performed as follows: In this step, the parameters $X_g$, $Y_g$, $Z_g$, $\beta_{g0}$, $\beta_{g1}$ and $\gamma_g$ for the compositing between layers 2 and 1 are obtained. Again, these parameters are obtained by using the Porter and Duff operator obtained in the step 603 to find the matching row in table 2 and reading out the parameters from that row.

The process described in FIG. 7, which details the process of computing the full compositing results for all groups in z-order, is identical for this CILP arrangement.

The process described in FIG. 8A, which details the process of calculating terms not including background layer, is similar to the first CILP arrangement, but the details of each step is changed. For present $3^{rd}$ CILP arrangement, the details of the steps are as follows:

In the step 801, the currently available input parameters are obtained. These input parameters are: $\alpha_1 S_1$, $\alpha_1$, $\alpha_2 S_2$, $\alpha_2$, $X_f$, $X_g$, $Y_f$, $Y_g$, $Z_f$, $Z_g$, $\beta_{f0}$, $\beta_{f1}$, $\beta_{g0}$, $\beta_{g1}$, $\gamma_f$ and $\gamma_g$. Note that $\alpha_0 S_0$, $\alpha_0$ are not available at this point.

In the 802 for the $3^{rd}$ CILP arrangement, the stage one calculations are performed for the group. The calculations are as follows:

$$I50 = Y_f - \alpha_1 Y_f + \alpha_1 \beta_{f0} + \gamma_f \alpha_1 S_1 \tag{51}$$

$$I51 = Y_g - \alpha_2 Y_g \alpha_2 \beta_{g0} + \gamma_{fg} \alpha_2 S_2 \tag{52}$$

$$I52 = \alpha_1 Z_f Z_g + \alpha_1 Z_f \beta_{f1} - Z_g \tag{53}$$

$$I53 = (\beta_{g1} + Z_g)(Y_f - \alpha_1(X_f - Y_f Z_f)) \tag{54}$$

$$I54 = \alpha_1 S_1 (\beta_{f1} + Z_f) \tag{55}$$

Equations 51-55 are partial sub-expressions of equation 16 which can be calculated independently of each other. The results of the sub-expressions 51-55 are represented by the terms 150-154 respectively. The terms in the sub-expressions 51-55 have been described previously in Table 1, Table 2 and Table 3 and Table 4.

The process then moves to the step 803. In this step, the stage two calculations are performed for the group. The calculations use the results of the numbered calculations from the step 802. The calculations are as follows:

$$I55 = I50 \times I51 \tag{56}$$

$$I56 = \alpha_2 S_2 \times I53 \tag{57}$$

$$I57 = \alpha_2 S_2 \times I52 \tag{58}$$

$$I58 = I51 \times I54 \tag{59}$$

$$I59 = Z_f \alpha_1 S_1 \times I51 \tag{60}$$

Equations 56-60 are partial sub-expressions of equation 16 which have further been simplified by representing the sub-expressions of equation 16 in terms of the results 150-154 of the partial sub-expressions 51-55. The partial sub-expressions 56-60 can be calculated independently of each other. The results of the sub-expressions 56-60 are represented by the terms 155-159 respectively. The terms in the sub-expressions 56-60 have been described previously in Table 1, Table 2 and Table 3 and Table 4.

Once the step 803 is completed, the process for FIG. 8A is complete.

The process depicted in FIG. 8B, which details the process performed by the step 703 in FIG. 7 of calculating the remaining group terms using results from group below, is similar to the $1^{st}$ CILP arrangement, but the details of each step is changed. For the $3^{rd}$ CILP arrangement, the details of the steps are as follows:

In the step 811 for the $3^{rd}$ CILP arrangement, the stage three calculations are performed for the group. The calculations are as follows:

$$\alpha_0 S_0 \times I55 + \alpha_0 \times (I56 + I58) + I57 + I59 \tag{61}$$

Equation 61 is an alternate form of the compositing equation 16 illustrating how the compositing equation 16 can be resolved from the results of the independent sub-expressions 51-60. The terms in equation 61 have been described previously in Table 1, Table 2 and Table 3 and Table 4.

The process then moves to the step 812. In this step, the computed group compositing result is outputted. The process described by FIG. 8B is then complete.

INDUSTRIAL APPLICABILITY

The arrangements described are applicable to the computer and data processing industries and particularly for the image rendering industry.

The foregoing describes only some embodiments of the present invention, and modifications and/or changes can be made thereto without departing from the scope and spirit of the invention, the embodiments being illustrative and not restrictive.

The invention claimed is:

1. A method of compositing a plurality of layers, the method comprising the steps of:
    grouping the plurality of layers comprising image data into at least a foreground group and a background group to be composited by separate computing threads, wherein a foreground compositing model for compositing layers in the foreground group is dependent on a compositing output for the background group;

identifying, in relation to the foreground group, independent instructions of the foreground compositing model to be executed independently from the background group and dependent instructions of the foreground compositing model requiring a compositing output of at least one layer of the background group in order to composite layers in the foreground group;

executing the identified independent instructions using image data associated with the layers in the foreground group in parallel with compositing the layers in the background group, a first independent instruction storing a corresponding result of execution in a first buffer and a second independent instruction storing a corresponding result in a second buffer;

upon receipt of the compositing output for the background group, executing the dependent compositing instruction by updating the second buffer using the background compositing output; and determining a compositing output for the foreground group dependent upon contents of the first buffer and the updated second buffer.

2. The method according to claim 1, wherein:
the independent instructions are sub-expressions of the foreground compositing model that contain only terms independent of the layers of the background group; and
the dependent instructions are sub-expressions that have at least one term dependent on the layers of the background group.

3. The method according to claim 1, further comprising, prior to the executing step, scheduling at least some of the independent instructions or the dependent instructions for execution by specified computing threads dependent upon cached locality of data in memory of processors executing the specified computing threads.

4. The method according to claim 1, further comprising, prior to the executing step, allocating (i) independent instructions using image data associated with the layers in the background group and (ii) the independent instructions using image data associated with the layers in the foreground group for execution by available threads or processors in any order provided that the independent instructions using image data associated with the layers in the background group are executed no later than the independent instructions using image data associated with the layers in the foreground group.

5. The method according to claim 1, wherein the executing step gives priority to instructions using image data associated with the layers in the background group over instructions using image data associated with the layers in the foreground group.

6. The method according to claim 1, wherein the grouping step further comprises the steps of:
identifying a number of available processing threads; and
specifying the number of layers in each group depending upon the number of identified threads.

7. The method according to claim 1, wherein an independent instruction for processing image data of the foreground group is scheduled to execute on a first computing thread, a dependent instruction for processing image data of the foreground group is scheduled to execute on a second computing thread, and the compositing output of the at least one background layer of the background group is communicated to the second computing thread for processing the image data of the foreground group.

8. The method according to claim 1, further comprising the steps of:
processing, in a first pass, the groups in order down a z-stack in a parallel manner, top-most group first, bottom-most group last to determine a top-most opaque level in the z-stack; and
processing, in a second pass, the groups in order up the z-stack in a sequential manner, reusing the independent terms for the layer groups that have been pre-calculated in the first pass.

9. The method according to claim 8, wherein the first pass processing is performed in order to determine a level in the z-stack having an opacity greater than a pre-determined threshold.

10. The method according to claim 1, further comprising the steps of:
processing, in a first pass, the groups in order down a z-stack in a parallel manner, top-most group first, bottom-most group last to determine a top-most group in the z-stack which does not contribute to the compositing output, the determining is based on at least one of opacity and a compositing operator associated with at least one layer in a group up in the z-stack; and
processing, in a second pass, the groups in order up the z-stack in a sequential manner, reusing the independent terms for the layer groups that have been pre-calculated in the first pass.

11. The method according to claim 1, wherein:
the grouping step is performed in regard to a plurality of foreground groups of layers and a plurality of background groups of layers; and
the executing step executes independent instructions for the plurality of foreground groups of layers in parallel.

12. An apparatus for compositing a plurality of layers, the apparatus comprising:
a memory storing a computer executable program; and
a processor for executing the program in order to perform a method comprising the steps of:
grouping the plurality of layers comprising image data into at least a foreground group and a background group to be composited by separate computing threads, wherein a foreground compositing model for compositing layers in the foreground group is dependent on a compositing output for the background group;
identifying, in relation to the foreground group, independent instructions of the foreground compositing model to be executed independently from the background group and dependent instructions of the foreground compositing model requiring a compositing output of at least one layer of the background group in order to composite layers in the foreground group;
executing the identified independent instructions using image data associated with the layers in the foreground group in parallel with compositing the layers in the background group, a first independent instruction storing a corresponding result of execution in a first buffer and a second independent instruction storing a corresponding result in a second buffer;
upon receipt of the compositing output for the background group, executing the dependent compositing instruction by updating the second buffer using the background compositing output; and
determining a compositing output for the foreground group dependent upon contents of the first buffer and the updated second buffer.

13. A computer readable non-transitory storage medium storing a computer executable program for directing a processor to perform a method for compositing a plurality of layers comprising the steps of:
- grouping the plurality of layers comprising image data into at least a foreground group and a background group to be composited by separate computing threads, wherein a foreground compositing model for compositing layers in the foreground group is dependent on a compositing output for the background group;
- identifying, in relation to the foreground group, independent instructions of the foreground compositing model to be executed independently from the background group and dependent instructions of the foreground compositing model requiring a compositing output of at least one layer of the background group in order to composite layers in the foreground group;
- executing the identified independent instructions using image data associated with the layers in the foreground group in parallel with compositing the layers in the background group, a first independent instruction storing a corresponding result of execution in a first buffer and a second independent instruction storing a corresponding result in a second buffer;
- upon receipt of the compositing output for the background group, executing the dependent compositing instruction by updating the second buffer using the background compositing output; and
- determining a compositing output for the foreground group dependent upon contents of the first buffer and the updated second buffer.

* * * * *